(12) United States Patent
Konishi

(10) Patent No.: US 9,426,350 B2
(45) Date of Patent: Aug. 23, 2016

(54) IMAGE CAPTURING APPARATUS AND CONTROL METHOD THEREOF

(71) Applicant: CANON KABUSHIKI KAISHA, Tokyo (JP)

(72) Inventor: Kazuki Konishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 14/495,187

(22) Filed: Sep. 24, 2014

(65) Prior Publication Data

US 2015/0092098 A1    Apr. 2, 2015

(30) Foreign Application Priority Data

Sep. 27, 2013    (JP) ................................ 2013-202233

(51) Int. Cl.
*H04N 5/232* (2006.01)
*H04N 5/235* (2006.01)

(52) U.S. Cl.
CPC ........ *H04N 5/23212* (2013.01); *H04N 5/2352* (2013.01)

(58) Field of Classification Search
CPC ........... H04N 5/23212; H04N 5/3696; H04N 5/2352
See application file for complete search history.

(56) References Cited

U.S. PATENT DOCUMENTS

| | | | |
|---|---|---|---|
| 2006/0221192 A1 | 10/2006 | Nakajima et al. | |
| 2008/0218611 A1 | 9/2008 | Parulski et al. | |
| 2008/0303925 A1 | 12/2008 | Oota | |
| 2009/0034954 A1 | 2/2009 | Kubota et al. | |
| 2010/0123818 A1* | 5/2010 | Ono | H04N 5/23212 348/345 |
| 2011/0141329 A1* | 6/2011 | Nakagawa | G02B 7/34 348/294 |
| 2012/0038810 A1* | 2/2012 | Taniguchi | H01L 27/14621 348/308 |
| 2012/0120277 A1 | 5/2012 | Tsai | |
| 2012/0147227 A1* | 6/2012 | Yoshimura | G02B 7/346 348/246 |

(Continued)

FOREIGN PATENT DOCUMENTS

| | | |
|---|---|---|
| JP | 04-070632 A | 3/1992 |
| JP | 08-265631 A | 10/1996 |

(Continued)

OTHER PUBLICATIONS

US Patent Application Publications 1-3 were cited in a related U.S. Appl. No. 14/493,374.

(Continued)

*Primary Examiner* — Christopher K Peterson
(74) *Attorney, Agent, or Firm* — Cowan, Liebowitz & Latman, P.C.

(57) ABSTRACT

In an image capturing apparatus comprising an image sensor has focus detection pixels and image forming pixels, a calculation unit calculates first and second charge accumulation periods, a control unit reads out an image forming signal from the image forming pixels accumulated for the first charge accumulation period and a focus detection signal from the focus detection pixels accumulated for the second charge accumulation period, a display unit displays the image forming signal, and a focus control unit performs phase difference focus control process based on the focus detection signal. When the second charge accumulation period is longer than the first charge accumulation period, the control unit reads out the focus detection signal and the image forming signal in parallel, and sets a readout rate of the focus detection signal to be lower than that of the image forming signal.

17 Claims, 13 Drawing Sheets

(56) References Cited

U.S. PATENT DOCUMENTS

| | | |
|---|---|---|
| 2012/0176505 A1 | 7/2012 | Kim et al. |
| 2012/0194731 A1 | 8/2012 | Kimoto |
| 2013/0113966 A1* | 5/2013 | Arishima ............... H04N 5/378 348/301 |
| 2013/0300895 A1 | 11/2013 | Kawarada |
| 2015/0229831 A1 | 8/2015 | Miyazawa |
| 2015/0256778 A1 | 9/2015 | Kusaka |

FOREIGN PATENT DOCUMENTS

| | | |
|---|---|---|
| JP | 2620235 | 6/1997 |
| JP | 2000-078461 A | 3/2000 |
| JP | 3105334 B | 10/2000 |
| JP | 2002-196220 A | 7/2002 |
| JP | 2007-065048 A | 3/2007 |
| JP | 2007-072013 A | 3/2007 |
| JP | 2007-097033 | 4/2007 |
| JP | 2007-101907 A | 4/2007 |
| JP | 2007-212723 A | 8/2007 |
| JP | 2007-212745 A | 8/2007 |
| JP | 2008-130531 | 6/2008 |
| JP | 4185741 B | 11/2008 |
| JP | 4235422 B | 3/2009 |
| JP | 2010-181751 A | 8/2010 |
| JP | 2011-150281 A | 8/2011 |
| JP | 2012-252280 A | 12/2012 |
| KR | 10-0643830 B1 | 11/2006 |

OTHER PUBLICATIONS

The above references were cited in related U.S. Appl. No. 14/487,740, filed Sep. 16, 2094 and U.S. Appl. No. 14/494,374, filed Sep. 23, 2014, both entitled "Image Capturing Apparatus and Control Method Thereof".

The above patent documents were cited in a European Search Report issued on Mar. 27, 2015, that issued in the corresponding European Patent Application No. 14182102.5, which is a counterpart application of a related application.

The above patent documents were cited in a Partial Search Report issued on Oct. 29, 2014, that issued in the corresponding European Patent Application No. 14182102.5, which is a counterpart application of the present application.

The above foreign patent documents were cited in the Mar. 11, 2016 Korean Office Action, that issued in Korean Patent Application No. 10-2014-0120817.

* cited by examiner

| A | B | A | B | A | B | A | B | A | B |
|---|---|---|---|---|---|---|---|---|---|
| A | B | A | B | A | B | A | B | A | B |
|   |   |   |   |   |   |   |   |   |   |
|   |   |   |   |   |   |   |   |   |   |
| A | B | A | B | A | B | A | B | A | B |
| A | B | A | B | A | B | A | B | A | B |
|   |   |   |   |   |   |   |   |   |   |
|   |   |   |   |   |   |   |   |   |   |
| A | B | A | B | A | B | A | B | A | B |
| A | B | A | B | A | B | A | B | A | B |

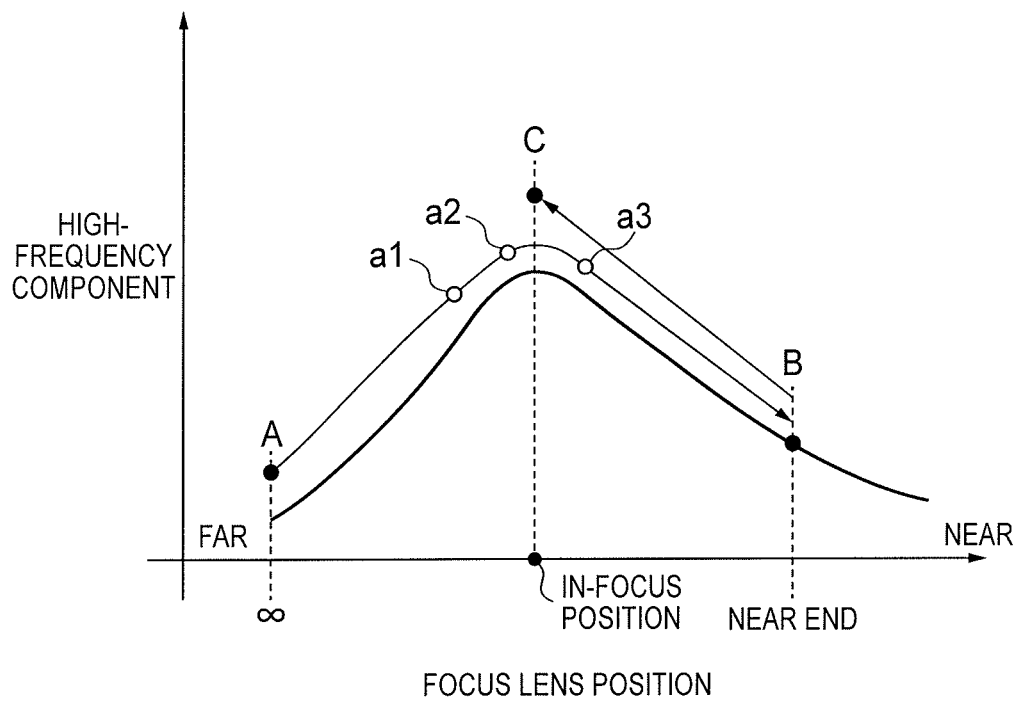

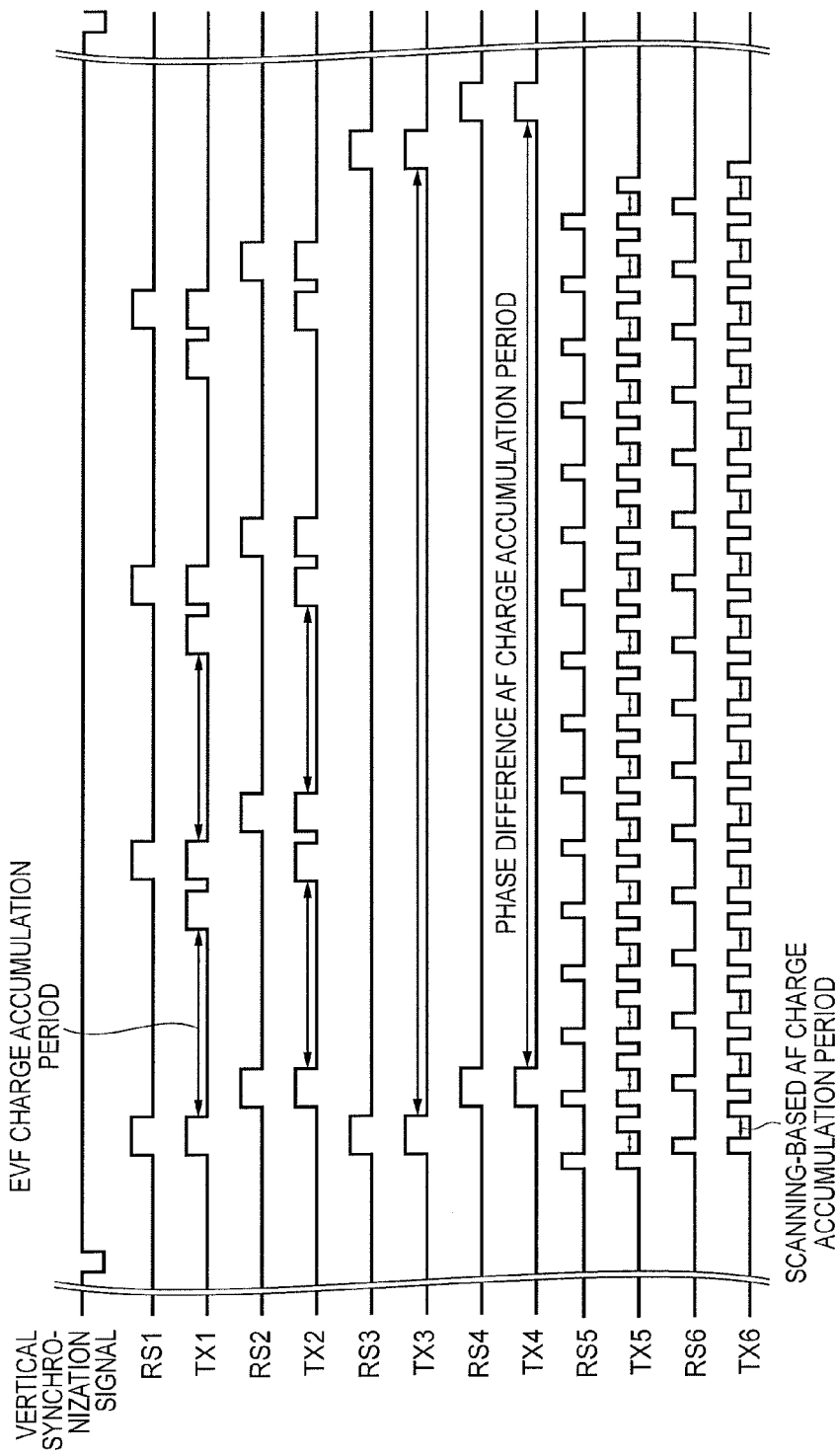

IMAGE CAPTURING APPARATUS AND CONTROL METHOD THEREOF

BACKGROUND OF THE INVENTION

1. Field of the Invention

The present invention relates to image capturing apparatuses and control methods thereof, and particularly relates to image capturing apparatuses that perform automatic focus adjustment, and to control methods thereof.

2. Description of the Related Art

Thus far, a variety of automatic focus adjustment methods have been proposed for image capturing apparatuses having image sensors in which focus detection pixels are discretely disposed. Japanese Patent Laid-Open No. 2010-181751 discloses a technique for an image capturing apparatus having an image sensor in which focus detection pixels are discretely disposed, in which a drop in image quality caused by the focus detection pixels is suppressed when performing decimating readout of pixel signals from the image sensor. Specifically, this document discloses selectively using a readout method that reads out the focus detection pixels or a readout method that does not read out the focus detection pixels by changing at least one of a decimation rate and a decimation phase during the decimating readout.

However, according to Japanese Patent Laid-Open No. 2010-181751, the readout method is selected based on a state of the image capturing apparatus, and thus although it is possible to achieve the optimal exposure in the respective readout methods, there is a problem in that it takes time to switch between the modes and change the exposure when the modes are switched.

SUMMARY OF THE INVENTION

The present invention has been made in consideration of the above situation, and carries out more accurate focus detection while controlling the exposure amount of an image to be displayed in a display device so as to be appropriate, without switching between a readout method for display and a readout method for focus detection.

According to the present invention, provided is an image capturing apparatus comprising: an image sensor having focus detection pixels that photoelectrically convert each of a pair of light fluxes that pass through different exit pupil areas of an imaging optical system and output a focus detection signal, and image forming pixels; a calculation unit configured to calculate a first charge accumulation period for the image forming pixels and a second charge accumulation period for the focus detection pixels; a control unit configured to read out the focus detection signal accumulated in the focus detection pixels and an image forming signal accumulated in the image forming pixels; a display unit configured to display the image forming signal read out after accumulated for the first charge accumulation period from the image forming pixels; and a focus control unit configured to perform phase difference focus control process based on the focus detection signal read out after accumulated for the second charge accumulation period from the focus detection pixels, wherein when the second charge accumulation period is set to be longer than the first charge accumulation period, the control unit reads out the focus detection signal and the image forming signal in parallel, and sets a readout rate of the focus detection signal to be lower than a readout rate of the image forming signal.

According to the present invention, provided is a control method for an image capturing apparatus including an image sensor having focus detection pixels that photoelectrically convert each of a pair of light fluxes that pass through different exit pupil areas of an imaging optical system and output a focus detection signal, and image forming pixels, the method comprising: a calculation step of calculating a first charge accumulation period for the image forming pixels and a second charge accumulation period for the focus detection pixels; a control step of reading out the focus detection signal accumulated in the focus detection pixels and an image forming signal accumulated in the image forming pixels; a display step of displaying, in a display unit, the image forming signal read out after accumulated for the first charge accumulation period from the image forming pixels; and a focus adjustment step of performing phase difference focus control process based on the focus detection signal read out after accumulated for the second charge accumulation period from the focus detection pixels, wherein when the second charge accumulation period is set to be longer than the first charge accumulation period, in the control step, the focus detection signal and the image forming signal are read out in parallel, and a readout rate of the focus detection signal is set to be lower than a readout rate of the image forming signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 12 is a graph for explaining scanning-based AF operations according to the first embodiment;

FIG. 13 is a diagram illustrating an arrangement of phase difference AF pixels in the image sensor according to the second embodiment;

FIG. 14 is a timing chart when performing phase difference AF and scanning-based AF according to the second embodiment.

DESCRIPTION OF THE EMBODIMENTS

Exemplary embodiments of the present invention will be described in detail in accordance with the accompanying drawings.

First Embodiment

Figure 1:
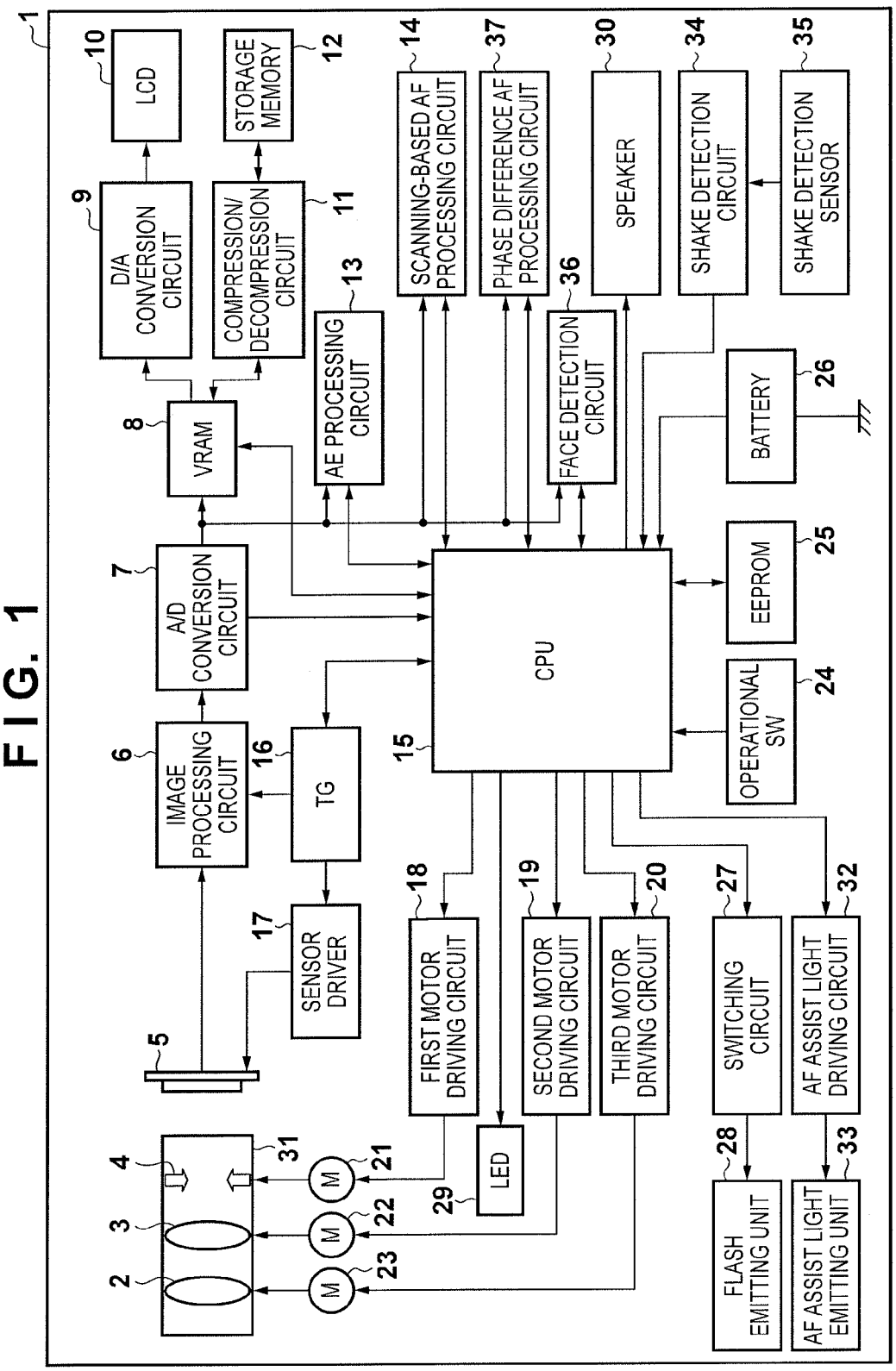
FIG. 1 is a block diagram illustrating the configuration of an image capturing apparatus according to first and second embodiments of the present invention.

FIG. 1 is a block diagram illustrating the overall configuration of an image capturing apparatus 1 according to a first embodiment of the present invention. In FIG. 1, an image capturing lens barrel 31 is configured of a zoom lens group 2, a focus lens group 3, as well as an aperture 4 that controls a light flux amount that traverses an imaging optical system configured of the zoom lens group 2, the focus lens group 3, and so on. An optical image of an object that has traversed the imaging optical system and whose light amount has been adjusted by the aperture 4 is formed on a light-receiving surface of an image sensor 5; the image sensor 5 photoelectrically converts the optical image of an object that has been formed and outputs an electrical image signal.

An image processing circuit 6 receives the image signal output from the image sensor 5 and performs a variety of image processes thereon, generating an image signal in a predetermined format; an A/D conversion circuit 7 converts an analog image signal generated by the image processing circuit 6 into a digital image signal (image data). The image data output from the A/D conversion circuit 7 is temporarily stored in a memory (a VRAM) 8 such as a buffer memory or the like. A D/A conversion circuit 9 reads out the image data stored in the VRAM 8 and converts that data into an analog image signal, and also converts the data into an image signal in a format suited to playback; the analog image signal is then displayed in an image display device 10 such as a liquid-crystal display (this will be referred to as an "LCD 10" hereinafter). The LCD 10 can also be used as an electronic viewfinder (EVF) by sequentially displaying images, obtained periodically by the image sensor 5, through the above procedure.

A compression/decompression circuit 11 is configured of a compression circuit and a decompression circuit; the compression circuit reads out the image data temporarily stored in the VRAM 8 and performs a compression process, an encoding process, and the like in order to convert the image data into a format suited to storage in a storage memory 12. The decompression circuit performs a decoding process, a decompression process, and the like in order to convert the image data stored in the storage memory 12 into a format suited to playback or the like. The storage memory 12 is configured of a semiconductor memory or the like, and stores image data. A semiconductor memory such as a flash memory, a semiconductor memory such as a card-type flash memory that has a card or stick shape and can be removed from the image capturing apparatus 1, or the like is employed as the storage memory 12. A variety of other media, such as magnetic storage media including hard disks, Floppy (registered trademark) disks, or the like can be used as well.

For example, the processing described hereinafter is carried out when, of operational switches 24 that will be described later, a mode toggle switch (not shown) is manipulated so that an image capturing mode is entered, and an exposure and recording operation is then instructed by a release switch being manipulated. First, image data temporarily stored in the VRAM 8 as described above is compressed and encoded by the compression circuit in the compression/decompression circuit 11, and is stored in the storage memory 12. Meanwhile, when a playback mode is entered, playback operations are started, and the following processing is carried out. First, the image data stored in the storage memory 12 in a compressed state undergoes a decoding process, a decompression process, and so on in the decompression circuit of the compression/decompression circuit 11, and is temporarily stored in the VRAM 8. The image data temporarily stored in the VRAM 8 is converted, using the D/A conversion circuit 9, into an analog signal in a format suited to display through the aforementioned processing, and is played back in the LCD 10 as an image.

A CPU 15 includes a memory used for computations, and controls the image capturing apparatus 1 as a whole. An AE processing circuit 13 carries out automatic exposure (AE) processing based on the image data output from the A/D conversion circuit 7. More specifically, the AE processing circuit 13 calculates an AE evaluation value (photometry result) based on the brightness of an object by performing computational processes such as cumulative addition on the luminance values of one screen's worth of image data that has been digitized by the A/D conversion circuit 7. The AE evaluation value is output to the CPU 15.

A scanning-based AF processing circuit 14 carries out automatic focus adjustment (AF) processing based on the image data output from the A/D conversion circuit 7. More specifically, the scanning-based AF processing circuit 14 uses a high pass filter (HPF) or the like to extract high-frequency components of image data corresponding to a region, in one screen's worth of the image data digitized by the A/D conversion circuit 7, in the screen that has been designated as an AF region. Furthermore, the scanning-based AF processing circuit carries out computational processing such as cumulative addition and calculates an AF evaluation value (focus evaluation value) corresponding to a contour component amount in the high frequency range. Note that the AF region may be a single location in a central area or an arbitrary area of the screen, a plurality of locations in a central area or an arbitrary area of the screen and adjacent thereto, a plurality of discretely distributed locations, or the like.

A timing generator (TG) 16 generates a predetermined timing signal. A sensor driver 17 drives the image sensor 5. The TG 16 outputs a predetermined timing signal to the CPU 15, the image processing circuit 6, and the sensor driver 17, and the CPU 15 carries out various types of control in synchronization with this timing signal. The image processing circuit 6 receives the timing signal from the TG 16 and performs various types of image processes, such as color signal separation, in synchronization therewith. Furthermore, the sensor driver 17 receives the timing signal from the TG 16 and drives the image sensor 5 in synchronization therewith.

Meanwhile, an aperture driving motor 21 drives the aperture 4, and a first motor driving circuit 18 controls the driving of the aperture driving motor 21. A focus driving motor 22 drives the focus lens group 3, and a second motor driving circuit 19 controls the driving of the focus driving motor 22. A zoom driving motor 23 drives the zoom lens group 2, and a third motor driving circuit 20 controls the driving of the zoom driving motor 23.

The CPU 15 controls the first motor driving circuit 18, the second motor driving circuit 19, and the third motor driving circuit 20. The driving of the aperture 4, the focus lens group 3, and the zoom lens group 2 is controlled via the aperture driving motor 21, the focus driving motor 22, and the zoom driving motor 23, respectively, as a result. The CPU 15 carries out AE control by finding a charge accumulation period and an aperture value at which an appropriate exposure amount is obtained based on the AE evaluation value and the like calculated by the AE processing circuit 13, controlling the first motor driving circuit 18 thereby driving the aperture driving motor 21, and adjusting the aperture value of the aperture 4 to an appropriate value.

The CPU 15 also controls the second motor driving circuit 19 to drive the focus driving motor 22 based on the AF evaluation value calculated by the scanning-based AF processing circuit 14 or a phase difference between two images found by a phase difference AF processing circuit 37, which will be described later. Through this, AF control that moves the focus lens group 3 to an in-focus position is carried out. Meanwhile, in the case where a zoom switch (not shown) in the operational switches 24 has been manipulated, the CPU 15 carries out magnification operations (zoom operations) of the imaging optical system in response thereto by controlling the third motor driving circuit 20, controlling the driving of the zoom driving motor 23, and moving the zoom lens group 2 as a result.

The operational switches 24 are configured of various types of switches, and include the following switches, for example. First, there is a main power switch for starting the image capturing apparatus 1 and supplying power thereto, a release switch for starting image capture operations (storage operations) and the like, a playback switch for starting playback operations, and the zoom switch for instructing changes in a zoom ratio, or in other words, for instructing the zoom lens group 2 to move. There is also an optical viewfinder (OVF)/electronic viewfinder (EVF) toggle switch and the like. In the present embodiment, the release switch is configured of a two-stage switch that has a first stroke (referred to as "SW1" hereinafter) and a second stroke (referred to as "SW2" hereinafter). When SW1 turns on, an instruction signal for starting AE processing and AF processing is generated prior to the start of image capture operations. Then, when SW2 turns on, an instruction signal for starting exposure and recording operations, in which an image is captured and recorded, is generated.

An EEPROM 25 is a read-only memory that can be electrically rewritten, and that stores, in advance, programs for carrying out various types of control, data used to perform various types of operations, and so on. Reference numeral 26 indicates a battery; 28 indicates a flash emitting unit; 27 indicates a switching circuit that controls the emission of flash light by the flash emitting unit 28; 29 indicates a display element, such as an LED, that performs warning displays and the like; and 30 indicates a speaker for carrying out audio-based guidance, warnings, and the like.

An AF assist light emission unit 33 is configured of a light source such as an LED that illuminates part or all of an object when obtaining the AF evaluation value, and an AF assist light driving circuit 32 drives the AF assist light emission unit 33.

A shake detection sensor 35 detects camera shake and a shake detection circuit 34 processes a signal from the shake detection sensor 35. A face detection circuit 36 receives the output from the A/D conversion circuit 7 and detects a position, size, and so on of a face in the screen. The face detection circuit 36 searches out characteristic areas of the face, such as the eyes, eyebrows, or the like, in the image data output from the A/D conversion circuit 7, and finds the position of a person's face in the image. The size, tilt, and so on of the face is also found from positional relationships such as the distances between characteristic portions of the face.

The phase difference AF processing circuit 37 corrects a signal for a focus detection process using a phase difference method (phase difference AF), calculates a correlation between a reference image (A image) and a comparison image (B image), and calculates an image shift amount at which the signals of the two images will match (that is, a phase difference between the two images). In the present embodiment, pixels for carrying out the phase difference AF are disposed in the image capturing surface.

Then, the CPU 15 carries out the phase difference AF by finding a defocus amount from the phase difference between the two images found by the phase difference AF processing circuit 37 and finding an amount by which to drive the focus lens group 3 in order to bring the scene into focus.

Figure 2:
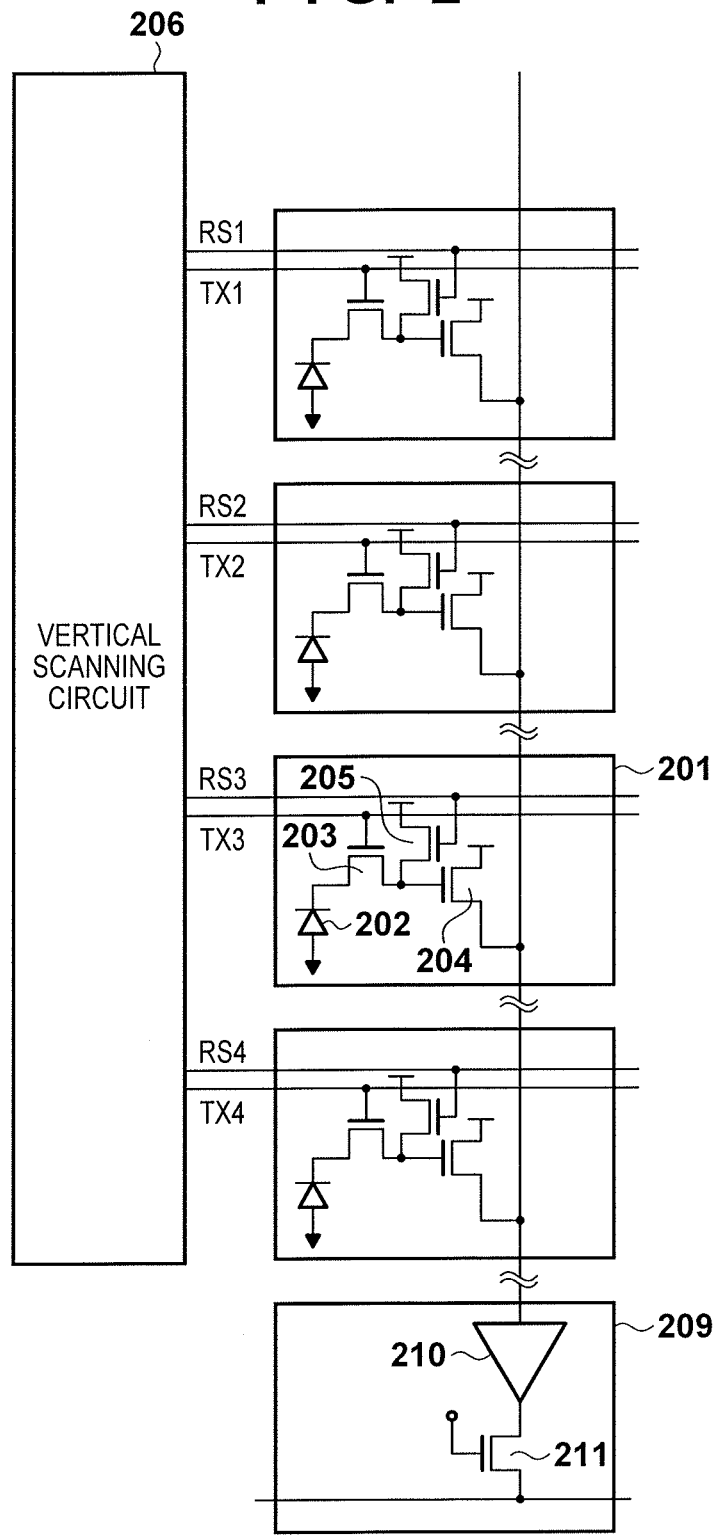
FIG. 2 is a circuit diagram illustrating an example of the configuration of pixels in an image sensor according to the first and second embodiments.
Figure 3:
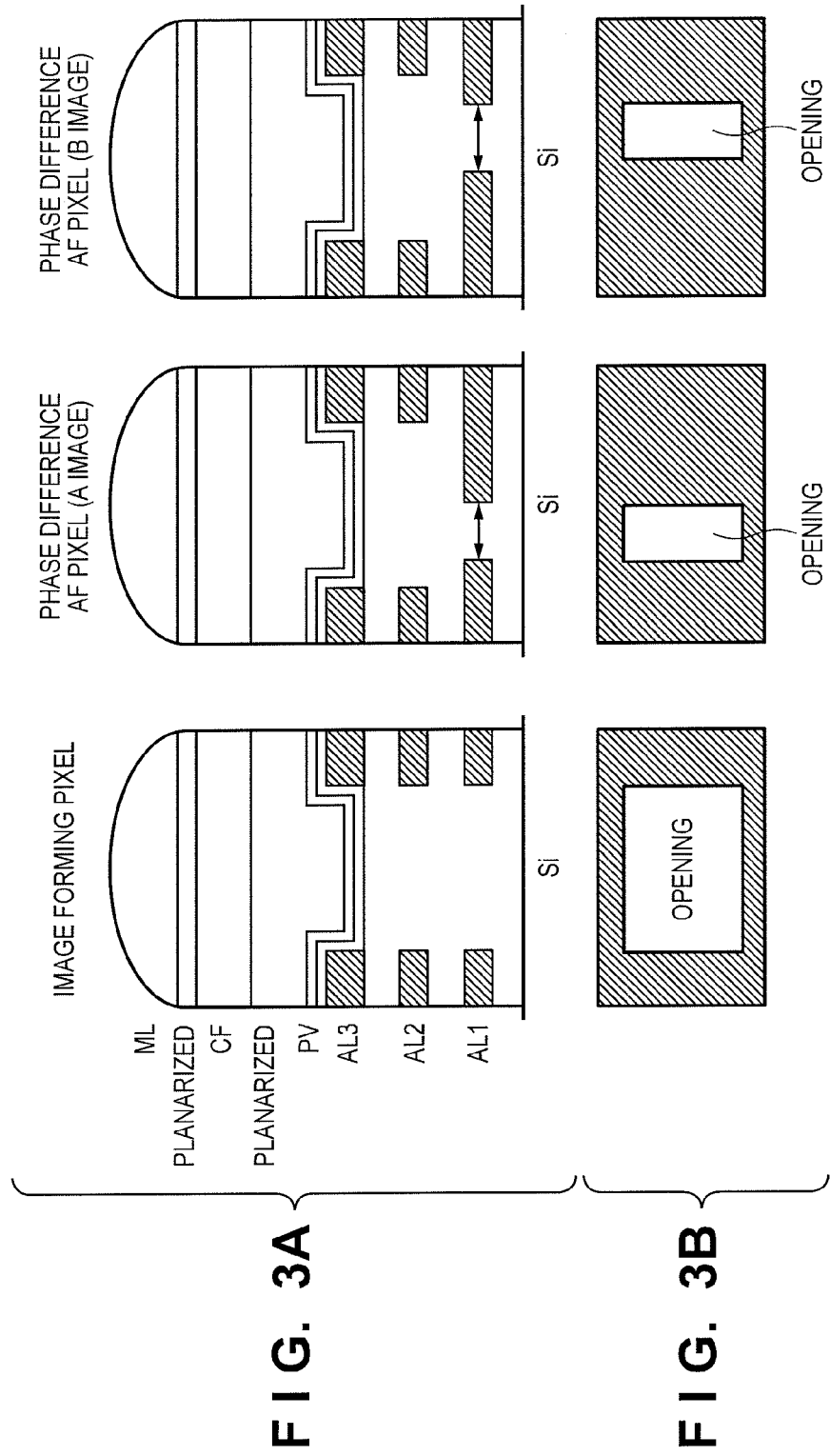
FIGS. 3A and 3B are schematic diagrams illustrating the structure of the pixels that configure the image sensor according to the first and second embodiments.

Next, the configuration of pixels provided in the image sensor 5 will be described with reference to FIGS. 2 and 3. FIG. 2 is a circuit diagram illustrating an example of the configuration of the pixels. A pixel unit 201, which corresponds to a single unit (pixel), is configured of a photodiode 202, a transfer transistor 203, a signal amplifier 204, and a reset transistor 205. The transfer transistor 203 and the reset transistor 205 operate in response to a signal from a vertical scanning circuit 206. The vertical scanning circuit 206 includes a shift register, a signal generating circuit that generates signals for the transfer transistor 203 and so on to drive the respective pixels, and the like. By controlling the transfer transistor 203 and the reset transistor 205 using generated timing signals (TX1 to 4, RS1 to 4, and so on), a charge in the photodiode 202 can be reset, read out, or the like, which makes it possible to control a charge accumulation period. Although FIG. 2 shows only four pixels, it should be noted that in actuality, many pixels that take the pixel unit 201 as pixel units are disposed two-dimensionally.

In the present embodiment, these pixels that are disposed two-dimensionally include both normal image forming pixels and phase difference AF pixels (focus detection pixels). In order to carry out phase difference AF in the image capturing surface, the phase difference AF pixels have more restricted openings in an AL1 layer than the normal image forming pixels, and exit pupils that pass through the microlenses are shifted, as shown in FIG. 3A. As a result, the phase difference AF pixels receive a pair of beams that pass through different exit pupil areas of the lenses included in the image capturing lens barrel 31. FIG. 3B is a diagram illustrating an example of light-receiving areas in the light-receiving surface of the image sensor 5 that correspond to the openings (that is, areas where light is incident via the openings). To obtain the reference image (A image) and the comparison image (B image), openings are provided in respectively opposite sides. There are cases where the aperture ratio of the phase difference AF pixels drops to approximately ¼ the aperture ratio of the image forming pixels, and in the case where the exposure conditions have been set so that the luminance of an image displayed in the LCD 10 is correct (within a predetermined range), the exposure amount of the phase difference AF pixels will be greatly insufficient.

A horizontal scanning circuit 209 includes a shift register (not shown), a column amp circuit 210, a signal output selection switch 211, an output circuit (not shown) for output to the exterior, and so on. The signals read out from the pixel can be amplified by changing settings of the column amp circuit 210 through a signal from the sensor driver 17.

Figures 4, 5:
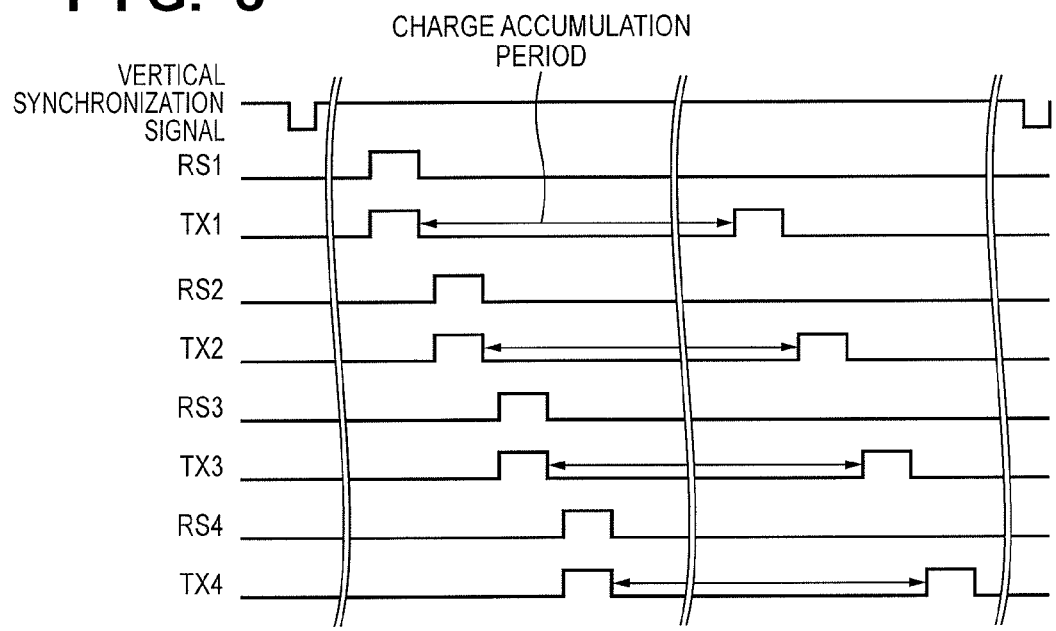
FIG. 4 is a diagram illustrating an arrangement of phase difference AF pixels in the image sensor according to the first embodiment.
FIG. 5 is a timing chart illustrating normal image capturing.

The phase difference AF pixels and the image forming pixels are disposed as shown in FIG. 4, for example. The pixels indicated by "A" in FIG. 4 are pixels, of the phase difference AF pixels, that form the reference image, the pixels indicated by "B" are pixels, of the phase difference AF pixels, that form the comparison image, and the remaining pixels are image forming pixels.

Next, operations carried out during normal image capturing using the image capturing apparatus 1 having the aforementioned configuration will be described. FIG. 5 is a timing chart illustrating signals generated by the vertical scanning circuit 206 when obtaining a normal image according to the first embodiment.

First, when the TX1 signal and the RS1 signal both become high, the transfer transistor 203 and the reset transistor 205 become conductive, and a charge in the photodiode 202 is reset. After the reset, charge accumulation begins when the TX1 signal becomes low. When a predetermined period of time has passed thereafter, the TX1 signal becomes high again, and the charge accumulated in the photodiode 202 is read out to the signal amplifier 204 via the transfer transistor 203. The time from when the TX1 signal becomes low to when the TX1 signal becomes high serves as the charge accumulation period (shutter speed). This operation is carried out sequentially according to a predetermined order (from TX1 to TX4, and from RS1 to RS4, in the example shown in FIG. 5), under conditions set by the TG 16. An image signal is generated from the signal from the signal amplifier 204 and is output through the horizontal scanning circuit 209. This operation is also carried out under conditions set by the TG 16.

In the present embodiment, the image sensor 5 provided in the image capturing apparatus 1 is a CMOS image sensor. Accordingly, depending on the settings of the shift register in the vertical scanning circuit 206, it is possible to select in what order to drive the transfer transistors 203 of a given row; furthermore, the same row can be selected repeatedly and the signals read out therefrom. Furthermore, depending on the settings of the shift register in the horizontal scanning circuit 209, it is possible to select which column signal output will start from among signals in the row that has been read out, by causing the selection switch 211 of that column to operate. Through this, the order in which signals are to be read out can be specified, as can the pixel within the screen from which the readout is to start.

Figure 6:
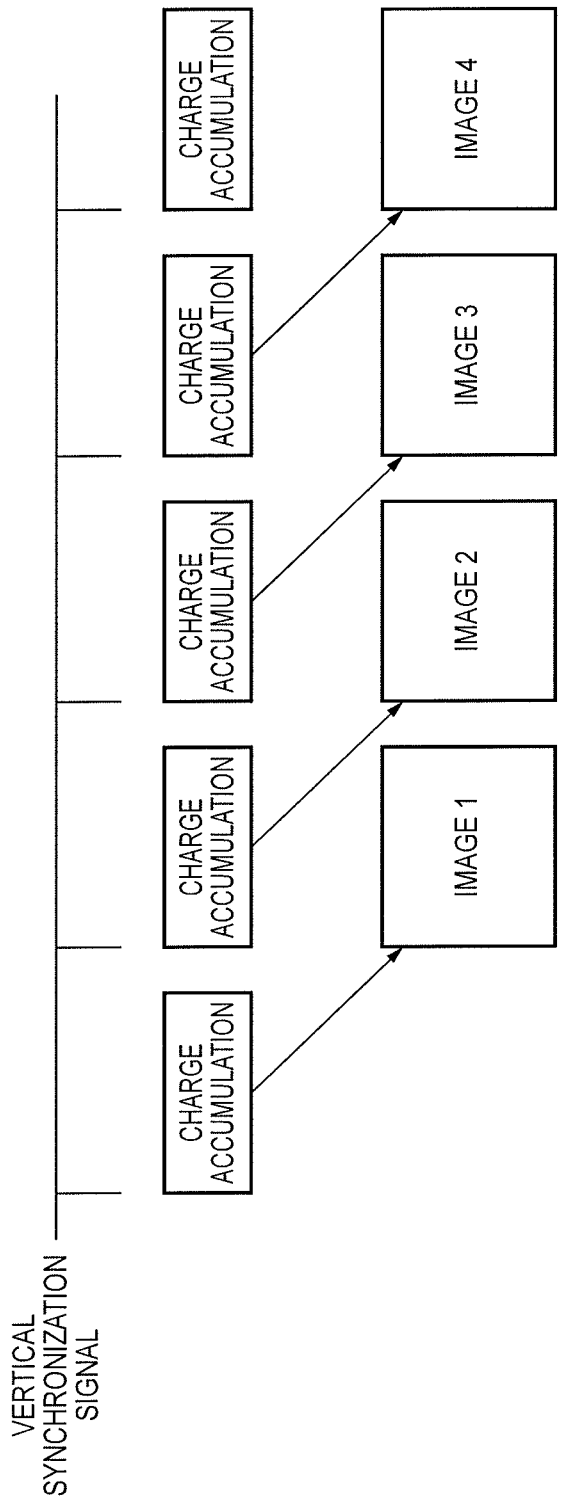
FIG. 6 is a diagram illustrating charge accumulation periods and image readout timings during normal image capturing.

FIG. 6 illustrates charge accumulation periods and the timings at which accumulated charges are read out as images. Exposure and signal readout are carried out based on vertical synchronization signals generated by the TG 16 and the sensor driver 17.

Figure 7:
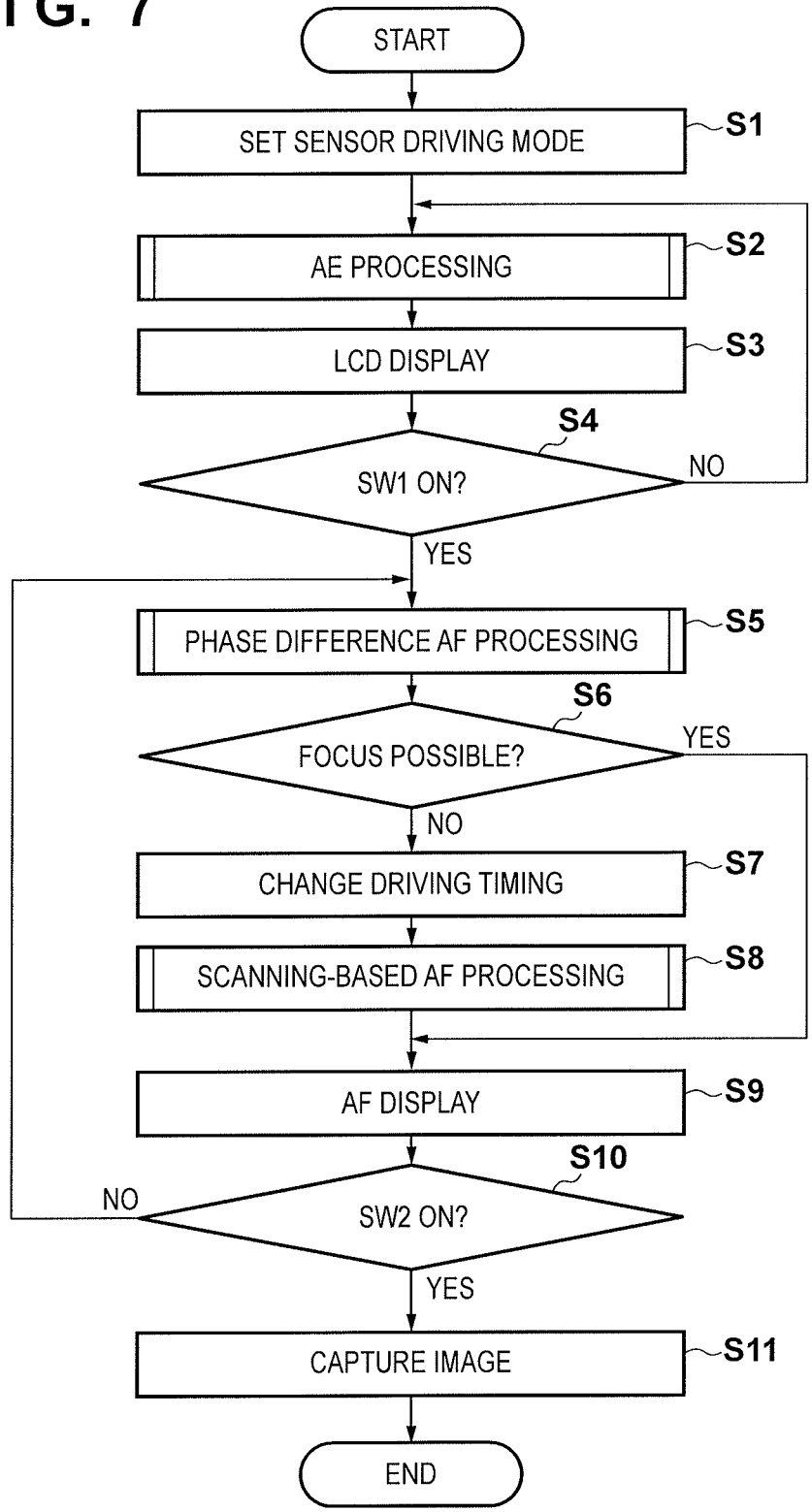
FIG. 7 is a flowchart illustrating an image capturing operation procedure according to the first embodiment.

Next, image capture operations performed by the image capturing apparatus 1 having the aforementioned configuration according to the first embodiment will be described with reference to FIGS. 7 to 12. FIG. 7 is a flowchart illustrating a main flow of image capture operations; when the main power switch of the image capturing apparatus 1 is on and an operating mode of the image capturing apparatus 1 is set to an image capturing (recording) mode, image capturing is enabled by supplying power to the image sensor 5 and the like, after which the image capture operations are carried out.

Figure 8:
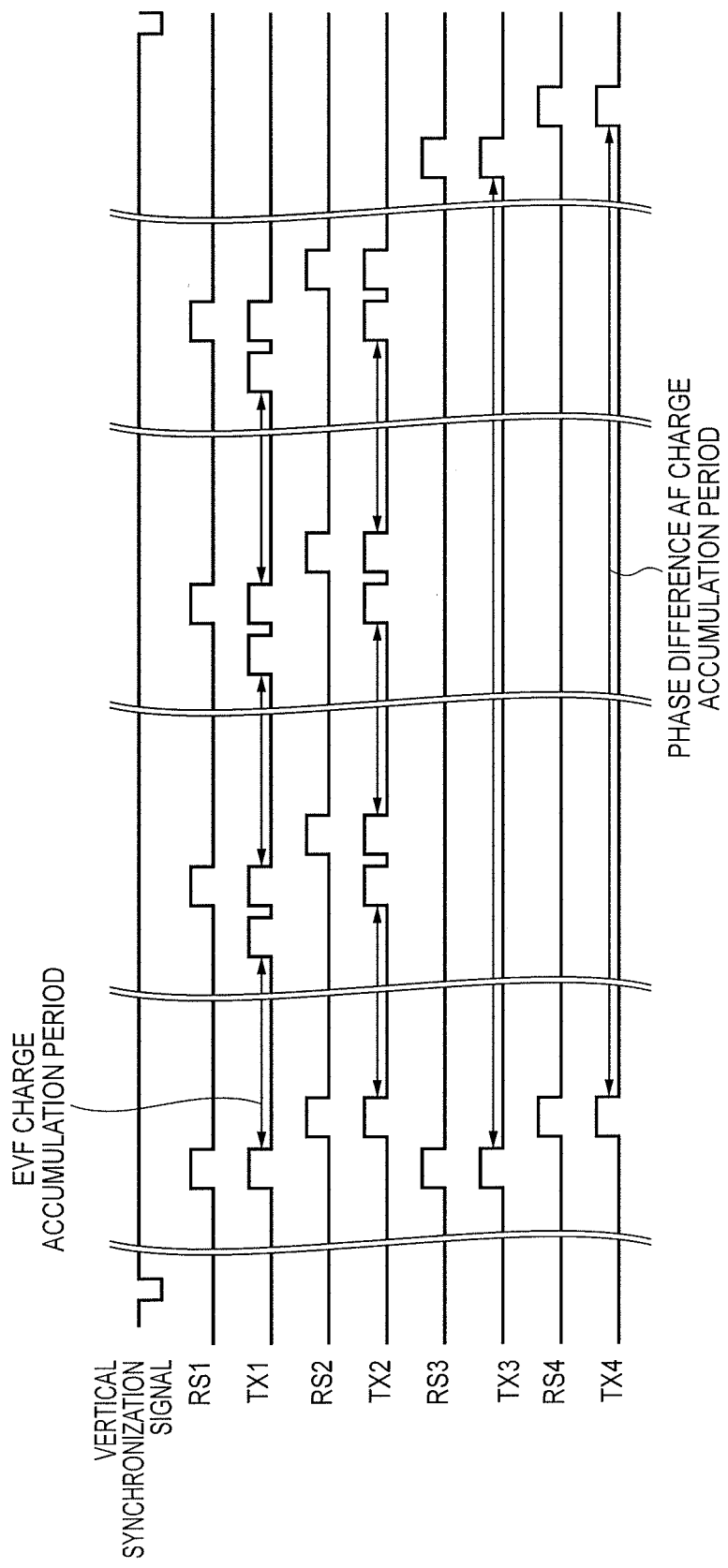
FIG. 8 is a timing chart for obtaining an EVF image signal and a phase difference AF image signal according to the first embodiment.

First, in step S1, the CPU 15 sets a driving mode of the image sensor 5 in order to carry out an EVF display for display in the LCD 10 and the phase difference AF in parallel. FIG. 8 illustrates a timing chart for this driving mode. In this driving mode, the readout rates from the image sensor 5 for both the EVF image signal and the phase difference AF image signal are set to a maximum of approximately 60 fps.

As described above, the phase difference AF pixels have a smaller aperture ratio than the image forming pixels. Accordingly, in the present first embodiment, the phase difference AF pixels and the image forming pixels are exposed under different exposure conditions, and the image signals from the phase difference AF pixels and the image signals from the image forming pixels are read out at approximately the same time. To be more specific, the charge accumulation period for obtaining the phase difference AF image signal is set to be longer than the charge accumulation period for obtaining the EVF image signal, as shown in FIG. 8. The readout rate of the signals for carrying out the phase difference AF operations becomes slower as a result. To achieve this, the exposure conditions for obtaining the EVF image signal and the phase difference AF image signal, respectively, are set for every two lines, and different timings are set for the reset of and output transfer from the image sensor 5. The actual exposure condition settings are made during AE processing in step S2.

It is necessary to determine the exposure conditions for the EVF image by taking into consideration the exposure amount, panning, tracking of object movement, and so on that is optimal for a user's ability to view the object. On the other hand, the exposure conditions, and particularly the charge accumulation period, for the phase difference AF image signal are determined taking into consideration the exposure amount, AF period, movement of the object during the AF period, the effects of camera shake on the AF, and so on that are optimal for the phase difference AF. As shown in FIGS. 3A and 3B, the image forming pixels and the phase difference AF pixels have different aperture ratios, and at positions distanced from the center of the image sensor 5, the amount of incident light drops due to the light flux entering from the exit pupil of the image capturing lens barrel 31 being tilted. Accordingly, the phase difference AF pixels require a greater exposure amount than the image forming pixels, by no less than the percentage of the aperture ratio (for example, no less than approximately four times the exposure amount).

Figure 9:
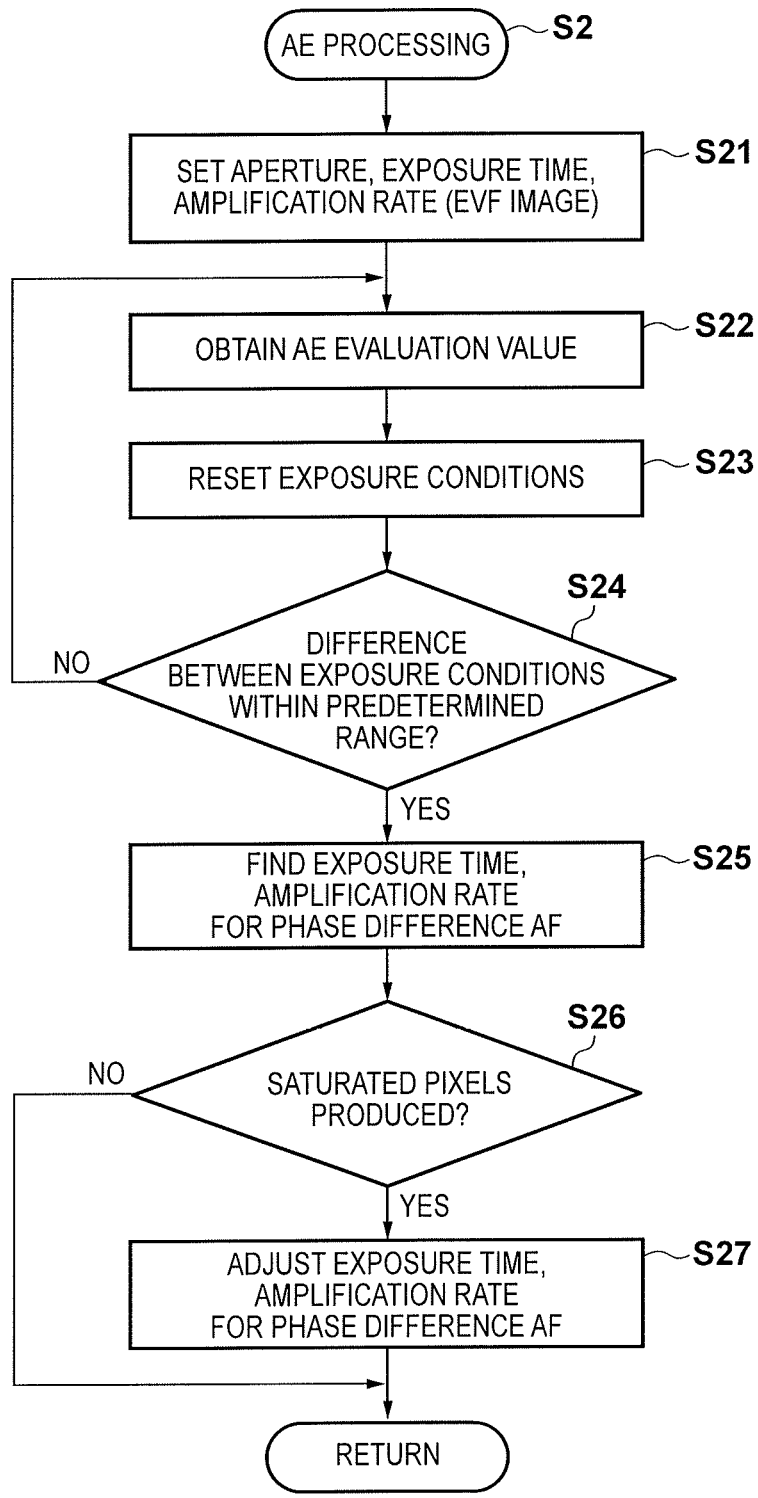
FIG. 9 is a flowchart illustrating a procedure for AE processing according to the first embodiment.

Here, the AE processing according to the first embodiment, carried out in step S2, will be described in detail using FIG. 9. First, in step S21, referring to the AE evaluation value calculated by the AE processing circuit 13 based on the image data obtained through the image capturing, a combination of the aperture value, amplification rate, and charge accumulation period for achieving an appropriate exposure amount are determined as the EVF image exposure conditions. At this time, the EVF image charge accumulation period is set with a limit of ⅛ second on a slow shutter speed side and a minimum charge accumulation period determined based on the capabilities of the image sensor 5 and so on as a limit on the fast shutter speed side. The amplification rate is set by adjusting a value of the column amp circuit 210. The values are determined using a method, referred to as a "program line", in which the aperture value, amplification rate, and charge accumulation period are determined collectively once the luminance of an object has been measured. Details thereof are disclosed in, for example, Japanese Patent Laid-Open No. 2000-78461, Japanese Patent Laid-Open No. 4-70632, and so on, and thus descriptions thereof will be omitted here.

Next, in step S22, the AE evaluation value is once again calculated by the AE processing circuit 13 based on image data obtained using the set exposure conditions, and the appropriate exposure conditions are once again determined in step S23 based on the calculated AE evaluation value. Then, in step S24, it is determined whether or not a difference between the exposure conditions that have been set again and the exposure conditions set previously is within a predetermined range. The process returns to step S22 in the case where the difference is not within the predetermined range, and the process for determining the exposure conditions is repeated until the difference falls within the predetermined range.

In the case where the difference between exposure conditions is within the predetermined range (YES in step S24), the process moves to a process for determining phase difference AF exposure conditions, carried out from step S25 on. However, because the aperture value in the phase difference AF exposure conditions is the same as the aperture value in the EVF exposure conditions, the charge accumulation period and the amplification rate are determined again.

First, in step S25, the phase difference AF charge accumulation period and amplification rate are found. The AE evaluation value is found by the AE processing circuit 13 based on image signals output from image forming pixels having high aperture ratios, or in other words, based on the EVF image data. As such, if a charge accumulation period optimal for the EVF image has been found, an inverse multiple of that value may be obtained by multiplying the percentage of the aperture ratio by a ratio of a light-attenuation amount of incident light resulting from an image height to a central pixel. For example, if the aperture ratio is ⅓ and the light-attenuation amount is 0.8×, the exposure amount is set to 3.75×, whereas if the aperture ratio is ¼ and the light-attenuation amount is 0.8×, the exposure amount is set to 5×.

This light-attenuation amount depends on the angle of incidence of the incident light flux resulting from the image height, and thus is a function of the exit pupil distance of the image capturing lens barrel 31, image height, and the aperture value when carrying out phase difference AF. As such, the average value thereof is used when carrying out phase difference AF using the entire screen, but in the case where the area for phase difference AF (a focus detection area) is limited to a part of the screen, such as the case where the user has selected a position in the screen for performing focus detection (an AF point), the light-attenuation amount is calculated for that region.

Then, as described earlier, the charge accumulation period is changed and the amplification rate is set based on the percentage of the aperture ratio and the calculated light-attenuation amount. The charge accumulation period is set with an update period (cycle) for the EVF image display as a limit on the slow shutter speed side so that the time required for the phase difference AF does not become long. Likewise, the charge accumulation period is set with the minimum charge accumulation period determined based on the capabilities of the image sensor 5 and so on as a limit on the fast shutter speed side. Furthermore, because it is necessary to take into consideration a drop in the AF accuracy due to camera shake, the upper limit value is reduced in accordance with the focal length in the case where the focal length is greater than a predetermined value.

The update period for the EVF image display is set to the charge accumulation period, and an insufficient exposure amount is compensated for by amplifying the signal, in the case where the charge accumulation period obtained by taking an inverse multiple of the optimal charge accumulation period for the EVF image is longer than the upper limit value. For example, in the case where the update period for EVF image display is ⅛ second and the calculated charge accumulation period is ¼ second, the charge accumulation period is set to ⅛ second, and the signal is amplified 2×. The amplification rate is set by adjusting the value of the column amp circuit 210, as described above. However, from the standpoint of the SN ratio of the signal, there is a limit on the setting of the amplification rate; thus in the case where the exposure amount is insufficient even when the EVF image display update period is set to the charge accumulation period and the amplification rate is set to that limit, even if the charge accumulation period becomes longer than the upper limit value, the charge accumulation period is lengthened in response to the insufficient exposure amount.

Next, in step S26, it is determined whether saturated pixels will be present in the phase difference AF pixels in the case where an image is captured under the exposure conditions found in step S25. Saturation negatively affects the phase difference AF, and thus it is necessary to make fine adjustments to the exposure conditions so that the phase difference AF pixels are not saturated. In the case where there are no saturated pixels, the exposure conditions found in step S23 are used as the EVF exposure conditions, whereas the charge accumulation period and amplification rate found in step S25 and the aperture value found in step S23 are taken as the phase difference AF exposure conditions, and the process returns to that illustrated in FIG. 7.

Whether or not there are saturated pixels can be determined from the signals output from the phase difference AF pixels and the percentage of the aperture ratio at the point in time when the AE evaluation value is obtained. First, a maximum value of the signals output from the phase difference AF pixels at the point in time when the AE evaluation value is obtained is found, and multiplied by the inverse value, as described above. If the resultant product appears to exceed the saturation value, it can be assumed that the signals output from the phase difference AF pixels will be saturated under the exposure conditions determined through the procedure carried out thus far. This is because the AE evaluation value has been calculated under the EVF exposure conditions and an inverse multiple of that value has been used for the phase difference AF exposure conditions, as described above. In the case where saturated pixels are present, the charge accumulation period and amplification rate are adjusted in step S27. First, a result of multiplying the EVF charge accumulation period found in step S23 by a coefficient 1, found through the following formula, is taken as the phase difference AF charge accumulation period.

coefficient 1=(saturation value)÷(maximum value of phase difference AF image signal under EVF exposure conditions)

In the case where the charge accumulation period that has been found is longer than the upper limit value, the EVF image display update period is taken as the charge accumulation period, and an insufficient exposure amount is compensated for by amplifying the signal. For example, in the case where the update period for EVF image display is ⅛ second and the calculated charge accumulation period is ¼ second, the charge accumulation period is set to ⅛ second, and the signal is amplified 2×. The amplification rate is set by adjusting a value of the column amp circuit 210. However, from the standpoint of the SN ratio of the signal, there is a limit on the setting of the amplification rate; thus in the case where the exposure amount is insufficient even when the EVF image display update period is set to the charge accumulation period and the amplification rate is set to that limit, even if the charge accumulation period becomes longer than the upper limit value, the charge accumulation period is lengthened to respond to the insufficient exposure amount.

Note that the method for determining the phase difference AF charge accumulation period described above is carried out for normal objects, and in the case where AF is carried out for objects that are point light sources, such as lighting sources, heavenly bodies, sunsets, sunrises, and so on, it is not necessary to find the charge accumulation period through an inverse multiple. Such objects saturate, and thus in the case where a point light source object has been determined through a known method (the method disclosed in Japanese Patent Laid-Open No. 2011-150281, for example), the exposure conditions are set to the same exposure conditions as those used for the EVF image. Whether or not saturated pixels are present under such exposure conditions is determined, and in the case where saturated pixels are present, the charge accumulation period and amplification rate are adjusted in step S27. The process then advances to step S3 of FIG. 7, where the charge accumulation period and amplification rate adjusted in step S27 as well as the aperture value found in step S23 are taken as the phase difference AF exposure conditions.

Once the exposure conditions have been set, in step S3, an image is captured under the determined exposure conditions, and an image formed by the image forming pixels is displayed as an image in the LCD 10. Here, the TX signal and RS signal are controlled as illustrated in FIG. 8. FIG. 8 is a timing chart illustrating signals generated by the vertical scanning circuit 206 in order to obtain the EVF image signal and the phase difference AF image signal.

By driving the image sensor 5 according to the timing shown in the timing chart in FIG. 8, the EVF image signal and the phase difference AF image signal can be obtained approximately at the same time, under different exposure conditions and at different readout rates. To achieve this, the exposure conditions for obtaining the EVF image and the phase difference AF signal, respectively, are set for every two lines, and different timings are set for the reset of and output transfer from the image sensor 5.

In other words, for both the EVF signal and the phase difference AF signal, the charge in the photodiode 202 of each pixel is reset and exposure is started when the TX signal and the RS signal become high. This operation is carried out sequentially according to a predetermined order in the pixel unit 201, under conditions set by the TG 16. Thereafter, after the EVF charge accumulation period determined in step S2 has passed, the TX1 and TX2 signals become high in sequence, and the charge in the photodiode 202 is read out to the signal amplifier 204, in a line for obtaining the EVF image. The read-out signal is output through the horizontal scanning circuit 209, and the EVF image signal is obtained.

Thereafter, the TX1 RS1, TX2, and RS2 signals become high in sequence once again, and the EVF line is reset. This operation is repeated in order to obtain the EVF image signal. Note that in the example shown in FIG. 8, the EVF image signal is read out three times and the phase difference AF image signal is read out once in a single vertical synchronization period. In this case, two of the three read-out EVF image signals are discarded. The EVF image signal read out last may be used to display the EVF in the LCD 10 in order to read out the EVF image signal and the phase difference AF image signal at approximately the same time. Furthermore, the timings of the TX1, TX2, RS1, and RS2 signals may be controlled so that the EVF image signal is read out only once in a single vertical synchronization period. An EVF image based on the image signal obtained in this manner is displayed in the LCD 10.

Likewise, in order to obtain the phase difference AF image signal, after the phase difference AF charge accumulation period determined in step S2 has passed, the TX3 and TX4 signals become high in sequence, and the charge in the photodiode 202 is read out to the signal amplifier 204. The read-out image signal is output through the horizontal scanning circuit 209, and the phase difference AF image signal is obtained.

Next, in step S4, the state of the release switch is checked. When the CPU 15 has confirmed that the user has manipulated the release switch and SW1 is on, the process advances to step S5, where the phase difference AF processing is carried out. This process will be described later.

Figure 11:
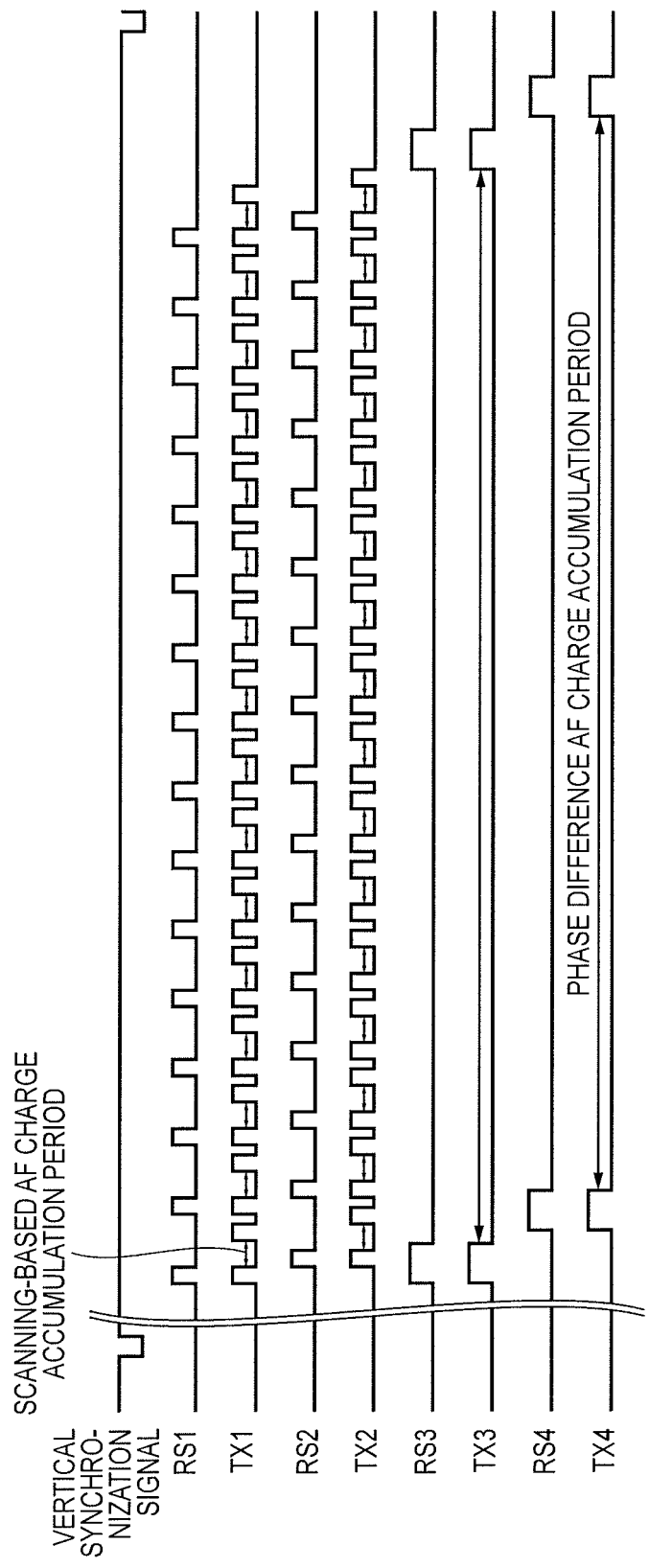
FIG. 11 is a timing chart when performing scanning-based AF according to the first embodiment.

If it is determined in step S6 that the phase difference AF processing has resulted in an in-focus scene, the process advances to step S9, where an AF OK display is carried out. Here, a process for lighting the LED 29, displaying a green frame in the LCD 10, or the like is carried out, for example. On the other hand, in the case where it is determined in step S6 that the scene is not in focus, the process advances to step S7, where the driving timing of the image sensor 5 is changed as indicated in FIG. 11. Note that the aperture is not changed.

In step S7, a framerate for obtaining a scanning-based AF image signal is increased in order to accelerate scanning-based AF processing carried out in step S8, which will be described later. Increasing the framerate shortens the charge accumulation period, and thus a sufficient signal level is ensured by increasing the amplification rate by a corresponding amount. However, a favorable scanning-based AF results cannot be ensured if the amplification rate is too high, and thus an upper limit is set for the amplification rate, and in the case where the corresponding amplification rate exceeds that upper limit, the amplification rate is set to the upper limit and the charge accumulation period is adjusted in order to ensure an appropriate exposure amount. The charge accumulation period is shorter than that indicated by the driving timing shown in FIG. 8 in this case as well.

For example, in the case where the upper limit of the amplification rate is set to five steps, the optimal charge accumulation period for the EVF image is $\frac{1}{30}$ second, and the amplification rate is 0, the scanning-based AF charge accumulation period will be $\frac{1}{120}$ second if the amplification rate is set to two steps. However, in the case where the optimal charge accumulation period for the EVF image is $\frac{1}{30}$ second and the amplification rate is four steps due to low illumination, the scanning-based AF charge accumulation period will be $\frac{1}{60}$ second if the upper limit of the amplification rate is set to five steps. Note that the EVF pixels are used as scanning-based AF pixels during the scanning-based AF processing.

The scanning-based AF processing is then carried out in step S8. Note that the scanning-based AF processing will be described in detail later with reference to FIGS. 11 and 12. Meanwhile, at the end of the scanning-based AF processing, the driving timing of the image sensor 5 is restored to the driving timing indicated in FIG. 8. If a result of the scanning-based AF processing indicates that the scene is in focus, the process advances to step S9 and the AF OK display is carried out.

However, in the case where it is determined that the scene is not in focus in step S8, the process advances to step S9 and an AF NG display is carried out. Here, a process for causing the LED 29 to blink and simultaneously displaying a yellow frame in the LCD is carried out, for example.

In step S10, the CPU 15 checks the state of SW2, and if SW2 is on, the process advances to step S11, where image capturing is carried out; when the image capturing ends, the series of image capture operations end.

Figure 10:
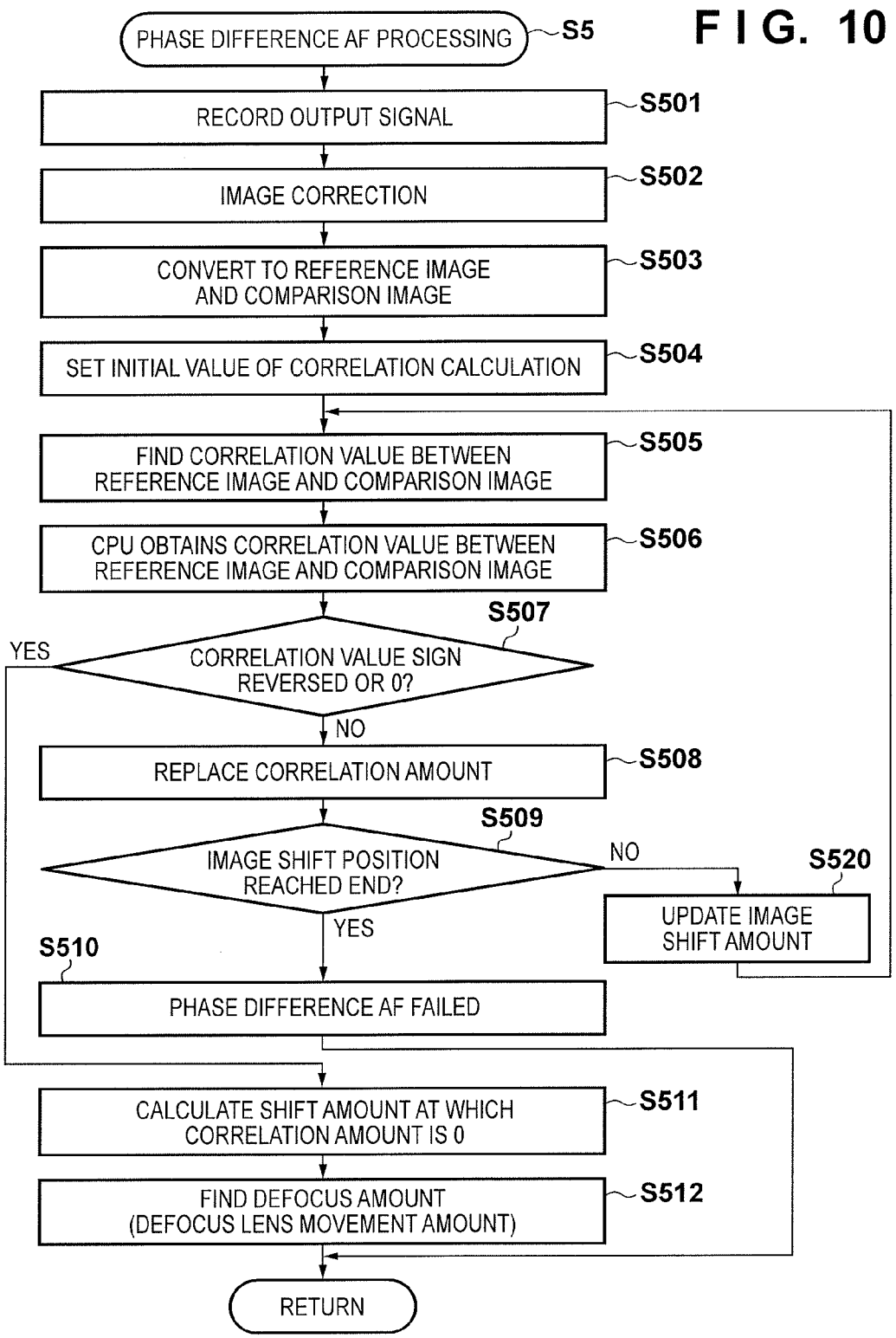
FIG. 10 is a flowchart illustrating a procedure for phase difference AF processing according to the first embodiment.

Next, an overview of the phase difference AF processing for detecting the in-focus position, carried out in step S5, will be given using FIG. 10. As described above, the exposure conditions are set for EVF and for phase difference AF, respectively, every two lines, in order to obtain the EVF image signal and the phase difference AF image signal under different exposure conditions. As a result, the EVF image signal can be obtained during phase difference AF processing as well, and thus an image resulting from the obtained EVF image signal is displayed in the LCD 10.

First, in step S501, the phase difference AF image signal output from the A/D conversion circuit 7 is recorded into a predetermined recording region of the phase difference AF processing circuit 37. Then, in step S502, the recorded image is corrected. As described above, in the present embodiment, pixels for carrying out the phase difference AF are disposed in the image capturing surface. Accordingly, unlike external phase difference AF, a field lens that corrects image distortion caused by differences in light fluxes due to the image height, an aperture for restricting the pupil position of light fluxes entering a phase difference AF sensor, and a mask for blocking unnecessary light fluxes cannot be disposed between the image forming surface and the sensor. Accordingly, the phase difference AF signal will have different shading and offset from pixel to pixel, which it is necessary to correct. As such, the phase difference AF processing circuit 37 handles an image correction function and a function for finding a defocus amount through correlation processing.

This shading will differ depending on the position of the pixel relative to the center of the optical axis (that is, the image height), the exit pupil position and aperture of the imaging lens, the position of the opening portions in the pixel, and each of these factors owes image correction amount; thus the image correction is carried out for each phase difference AF pixel in accordance with that factor. Furthermore, the offset will differ depending on the amplification rate of the phase difference AF pixels and the position of the opening portions in the pixels, as well as on the characteristics of the column amp for the phase difference AF pixels; each of these factors has its own image correction amount, and thus the image correction is carried out for each phase difference AF pixel in accordance with that factor. Note that details of the image correction method can be found in Japanese Patent Laid-Open No. 2012-252280, for example, and thus descriptions thereof will be omitted here.

Then, in step S503, the corrected phase difference AF image signal is rearranged and the reference image and comparison image are generated. The phase difference AF pixels are disposed as shown in FIG. 4, for example.

The output of the phase difference AF pixels indicated in the drawings by "A" and "B" are recorded in the phase difference AF processing circuit 37, and the readout order goes from "A", to "B", to "A", to "B", and so on, ending in "A" and then "B". The output after the image correction carried out in step S502 is recorded into a predetermined recording region of the phase difference AF processing circuit 37 in the same order. Accordingly, image signals output from pixels that configure the reference image indicated by "A" are extracted, arranged in the extracted order, and taken as the reference image (A image). Likewise, image signals output from pixels that configure the comparison image indicated by "B" are extracted, arranged in the extracted order, and taken as the comparison image (B image).

Thereafter, in step S504, an initial value used when carrying out the correlation processing is set. Then, in step S505, the phase difference AF processing circuit 37 for which the initial value has been set carries out the correlation processing according to Formula (1), and a correlation value between the reference image (A image) and the comparison image (B image) is found.

$$Uk = \Sigma \max(aj+1, bj+k) - \Sigma \max(aj, bj+k+1) \quad (1)$$

Here, max(X,Y) indicates that the greater of X and Y will be taken. k, meanwhile, indicates an image shift amount for carrying out the correlation processing, and j indicates a number of pixels for carrying out the correlation processing; these values are initialized in step S504.

Then, in step S506, the CPU 15 obtains, from the phase difference AF processing circuit 37, the correlation value between the reference image (A image) and the comparison image (B image). If there is a correlation value already temporarily recorded in step S507, it is determined whether the sign of that correlation value is the same; in the case where the signs have reversed, or in the case where the obtained correlation amount is 0, the process advances from step S507 to step S511.

On the other hand, in the case where the signs are the same, in step S508, the obtained correlation value is replaced with the temporarily-recorded correlation value. In the case where there is no temporarily-recorded correlation value, the obtained correlation value is temporarily recorded. Then, in step S509, it is determined whether or not the shift amount has reached an end value in the process for finding the correlation value. In the case where the value has not reached the end value, the process advances to step S520, where the shift amount k is updated to k+1, after which the process returns to step S505. However, in the case where the value has reached the end value, the process advances to S510, where the phase difference AF is determined to be failed, after which the process ends.

In step S511, a shift amount by which the correlation amount reaches 0 is calculated. The correlation value computation is carried out while shifting one pixel at a time, and thus it is rare for the correlation amount calculated by the phase difference AF processing circuit 37 to reach 0. Accordingly, a shift amount at which the correlation amount will become 0 is found from the two correlation amounts whose signs are different and a shift amount between the two correlation amounts.

Assuming the sign of the correlation amount Uk has inverted between K=1 and K=1+1 as a result of calculating the correlation amount through Formula (1), an image shift amount δ at which the correlation amount will become 0 can be found through linear interpolation, as indicated in Formula (2).

$$\delta = l + |Ul| \div [|Ul| + |Ul+1|] \quad (2)$$

Here, |z| represents the absolute value of z.

Next, in step S511, a prediction amount P is found from the image shift amount δ, as indicated in Formula (3).

$$P = \delta - \Delta \quad (3)$$

Here, Δ represents an image shift amount when in focus. Then, in step S512, by using a baseline length determined based on the characteristics of the image capturing lens barrel 31, a defocus amount d (movement amount and direction of the focus lens group) is found from the prediction amount P through Formula (4), after which the process ends.

$$d = K \cdot P \quad (4)$$

Here, K represents a sensitivity with respect to the focus, and is a value that depends on the focal length of the image capturing lens barrel 31, the value of the aperture 4, and the image height; accordingly, a table that takes those values as parameters is prepared in the EEPROM 25, and the value is obtained by referring to that table. When the defocus amount has been found in step S512, the process returns to that shown in FIG. 7.

Next, the scanning-based AF processing for detecting the in-focus position, carried out in step S8 of FIG. 7, will be described using FIGS. 11 and 12.

Note that in the following descriptions, an operation for obtaining the AF evaluation value while moving the focus lens group 3 is referred to as "scanning", a position of the focus lens group 3 where the AF evaluation value is obtained is referred to as a "scan position", and an interval between scan positions is referred to as a "scanning interval". Furthermore, a range for obtaining the AF evaluation value (in other words, a range across which the focus lens group 3 is moved) will be referred to as a "scan range".

In the case where the focus can be adjusted as a result of carrying out the scanning-based AF under the exposure conditions set in step S8, the focus lens group 3 is controlled to the in-focus position. Conversely, in the case where the focus adjustment cannot be carried out, the focus lens group 3 is controlled to the focus lens position, called a hyperfocal position, where the focus lens group 3 focuses on the closest position of the depth of field that includes infinity on the far end of the field.

During the scanning-based AF processing, the image sensor 5 is driven according to the timing illustrated in the timing chart shown in FIG. 11, but the scanning-based AF image signal is obtained instead of the EVF image signal. Meanwhile, the phase difference AF image signal is obtained under the same exposure conditions as the phase difference AF processing of step S5, and is obtained in parallel with the scanning-based AF image signal at a different readout rate. To achieve this, the exposure conditions for obtaining the scanning-based AF image signal and the phase difference AF image signal, respectively, are set for every two lines, and different timings are set for the reset of and output transfer from the image sensor 5. However, the phase difference AF image signal is not used in the scanning-based AF processing.

Meanwhile, the charge accumulation period for the scanning-based AF is set, for example, with a limit of 1/32 second on the slow shutter speed side and the minimum charge accumulation period determined based on the capabilities of the image sensor 5 as a limit on the fast shutter speed side, and the values of the aperture and the column amp circuit 210 are adjusted, referring to the result of the AE processing performed in step S3, and setting the exposure amount to an appropriate amount. Although the exposure may be inappropriate for the EVF display during the scanning-based AF, an image suited to EVF display can be created by using a signal obtained by adding and amplifying the scanning-based AF image signal. Note that this process prioritizes the scanning-based AF capabilities even if the exposure may be inappropriate for the EVF display.

When the scanning-based AF charge accumulation period is shorter than the phase difference AF charge accumulation period, the readout rate for scanning-based AF will increase as a result. As one example, the scanning-based AF charge accumulation period is 1/128 second and the readout rate is 128 FPS, whereas the phase difference AF image charge accumulation period is 1/8 second and the readout rate is 8 FPS. The value of the aperture 4 is not changed.

Once the exposure conditions (charge accumulation period) have been set, the TX signals and the RS signals are controlled as indicated in FIG. 11. In other words, in the image forming pixels used for the scanning-based AF and the phase difference AF pixels, the charges of the photodiode 202 in each pixel is reset when both the TX signal and the RS signal become high, and the charge accumulation begins when the TX signal becomes low. This operation is carried out sequentially according to a predetermined order under conditions set by the TG 16. Then, in a row for scanning-based AF, the TX1 signal and TX2 signal become high sequentially after the predetermined charge accumulation period has passed; the charge in the photodiode 202 is read out to the signal amplifier 204, is output via the horizontal scanning circuit 209, and the scanning-based AF image signal is obtained. Thereafter, the TX1, RS1, TX2, RS2 signals become high in sequence once again, and the scanning-based AF line is reset. The same operations are repeated in order to obtain the scanning-based AF image signal. Then, the TX3 signal and TX4 signal become high sequentially after the phase difference AF charge accumulation period has passed; the charge in the photodiode 202 is read out to the signal amplifier 204, is output via the horizontal scanning circuit 209, and the phase difference AF image signal is obtained. However, the obtained phase difference AF image signal is not used in the scanning-based AF processing, as mentioned above.

These operations are carried out after the focus lens group 3 has been moved to a predetermined position, after which the obtained image signal is processed using the scanning-based AF processing circuit 14 and the AF evaluation value is calculated. Once the AF evaluation value has been obtained, the focus lens group 3 is moved to the next scan position, and the AF evaluation value is obtained through the same operations.

Details of the AF scanning operations will be described here using FIG. 12. The scanning-based AF is carried out, as described above, by finding the position of the focus lens group 3 at which the amount of high-frequency component extracted from an image signal output from the scanning-based AF pixels set every two lines in the image sensor 5 becomes maximum.

The CPU 15 controls the focus driving motor 22 via the second motor driving circuit 19 that controls the driving of the focus driving motor 22. Through this, the focus lens group 3 is moved from a position corresponding to a far end ("A" in FIG. 12) to a position corresponding to a near end set for each image capturing mode ("B" in FIG. 12). The output of the scanning-based AF processing circuit 14 (the AF evaluation value signal) is obtained during this movement. A position where the AF evaluation value signal is maximum ("C" in FIG. 12) is found from the obtained AF evaluation value signal at the point in time when the movement of the focus lens group 3 has ended, and the focus lens group 3 is then moved to that position.

The obtainment of the output from the scanning-based AF processing circuit 14 is carried out at a predetermined scanning interval rather than at all stopping positions where the focus lens group 3 can stop, in order to accelerate the scanning-based AF. In this case, the AF evaluation value signal can be obtained at points a1, a2, and a3 indicated in FIG. 12. In such a case, the in-focus position C is found, through an interpolation process, using the point where the AF evaluation value signal is a maximum value and the points therebefore and thereafter. The reliability of the AF evaluation value signal is evaluated before finding the point where the AF evaluation value signal is maximum ("C" in FIG. 12) through such interpolation. Japanese Patent No. 04235422 and Japanese Patent No. 04185741 disclose specific examples of such a method, and thus descriptions thereof will be omitted here.

In the case where reliability of the AF evaluation value is sufficient, the point where the AF evaluation value signal is maximum is found, and the AF OK display is carried out in step S9 of FIG. 7. However, in the case where the reliability is insufficient, the process for finding the point where the AF evaluation value signal is maximum is not carried out, and the AF NG display is carried out in step S9 of FIG. 7.

Note that the limit time on the slow shutter speed side is merely one example in the present embodiment, and different values may be used if the characteristics of the image sensor 5, the characteristics of the imaging optical system, and so on differ.

Although the present first embodiment describes a case where a single AF region (focus detection area) is set, a plurality of AF regions can be handled by repeating the same processing for each of the AF regions.

Furthermore, although the aforementioned first embodiment describes using a signal read out immediately after SW1 turns on in the phase difference AF processing, the phase difference AF signal obtained for carrying out the LCD display in step S3 may be continuously recorded, and a signal obtained immediately before SW1 turns on may be used in the phase difference AF processing.

Furthermore, in the case where the region in which phase difference AF is to be carried out has been limited to one part of the screen, such as the case where the user has selected a position in the screen for detecting the in-focus position (an AF position), the phase difference AF image signal may be read out from that region only. Through this, the time required to obtain the image signal for carrying out the phase difference AF can be shortened. Furthermore, after the image signal from that region only has been read out, the driving of the image sensor 5 may be stopped for a set period in order to conserve energy.

According to the present first embodiment as described thus far, it is possible to achieve both more accurate focus adjustment by setting an appropriate exposure amount for the phase difference AF pixels, which have smaller aperture ratios than the image forming pixels, and an improvement in the visibility of the object by setting an appropriate exposure amount for the image displayed in the display device.

Meanwhile, the output from a plurality of frames has conventionally been added in order to compensate for an insufficient exposure amount in the phase difference AF pixels, accurate focus adjustment can be carried out using the information obtained from a single frame in this embodiment, and thus the time required to obtain the phase difference AF information can be shortened.

Second Embodiment

Next, a second embodiment of the present invention will be described. In the second embodiment, three signals, namely the EVF image signal displayed in the LCD 10, the scanning-based AF image signal, and the phase difference AF image signal, are obtained under different exposure conditions, and are obtained at different readout rates. This point differs from the first embodiment, in which the two signals, namely the EVF image signal or the scanning-based AF image signal and the phase difference AF image signal are obtained under different exposure conditions and obtained at approximately the same time.

To achieve this, in the second embodiment, the exposure conditions for the EVF image signal, the scanning-based AF image signal, and the phase difference AF image signal, respectively, are set for every two lines, and different timings are set for the reset of and output transfer from the image sensor 5.

In the second embodiment, the pixels are disposed as shown in FIG. 13, for example. The pixels indicated by "A" in FIG. 13 are pixels, of the phase difference AF pixels, that form the reference image (the A image), the pixels indicated by "B" are pixels, of the phase difference AF pixels, that form the comparison image (the B image), and the remaining pixels are image forming pixels. Of the image forming pixels, the upper two lines are used for scanning-based AF, and the lower two lines are used for EVF.

Note that aside from the arrangement of the pixels, the configuration of the image capturing apparatus is the same as that described in the first embodiment, and thus detailed descriptions thereof will be omitted here.

In the present second embodiment, the image sensor 5 is driven according to the timing shown in the timing chart of FIG. 14. First, in the EVF pixels, the scanning-based AF pixels, and the phase difference AF pixels, the charge of the photodiode 202 in each pixel is reset when both the TX signal and the RS signal become high, and the charge accumulation begins where the TX signal becomes low. This operation is carried out sequentially under conditions set by the TG 16.

When, in the scanning-based AF rows, the predetermined charge accumulation period has passed, the TX5 signal and the TX6 signal become high in sequence, and the charge accumulated in the photodiode 202 is read out to the signal amplifier 204 via the transfer transistor 203. The read-out charge is output through the horizontal scanning circuit 209, and the scanning-based AF image signal is obtained. Thereafter, the TX5, RS5, TX6, RS6 signals become high in sequence once again, and the scanning-based AF line is reset. This operation is repeated in order to obtain the scanning-based AF image signal.

Likewise, when the predetermined EVF charge accumulation period has passed, the TX1 signal and the TX2 signal become high in sequence, and the charge accumulated in the photodiode 202 is read out to the signal amplifier 204 via the transfer transistor 203. The read-out charge is output through the horizontal scanning circuit 209, and the EVF image signal is obtained. Thereafter, the TX1, RS1, TX2, RS2 signals become high in sequence once again, and the EVF line is reset. This operation is repeated in order to obtain the EVF image signal. Note that in the example shown in FIG. 14, the EVF image signal is read out three times in a single vertical synchronization period, as in the first embodiment; one of these image signals is displayed in the LCD 10, and the other signals are discarded.

Likewise, when the predetermined phase difference AF charge accumulation period has passed, the TX3 signal and the TX4 signal become high in sequence, and the charge accumulated in the photodiode 202 is read out to the signal amplifier 204 via the transfer transistor 203, and is then output through the horizontal scanning circuit 209. The phase difference AF image signal is obtained in this manner.

Operations using the signals output from the image sensor 5 driven in this manner are carried out according to the procedure shown in FIG. 7, in the same manner as in the first embodiment. However, in the second embodiment, the scanning-based AF pixels are present, and thus the process of step S7 (changing the sensor driving timing) is not carried out. Meanwhile, the method for determining the exposure conditions for obtaining the respective signals is the same as in the first embodiment. The in-focus position is found by carrying out the phase difference AF processing and the scanning-based AF processing under the determined exposure conditions. The specific details of the processing are the same as in the first embodiment.

According to the present second embodiment as described above, the same effects as those of the first embodiment can be obtained; furthermore, because the EVF, scanning-based AF, and phase difference AF image signals can be obtained in parallel, it is not necessary to switch the driving method, which makes it possible to adjust the focus more quickly.

Furthermore, by carrying out scanning-based AF and obtaining an overall in-focus position prior to SW1 turning on, the amount of time required for image capturing preparations after SW1 has turned on can be shortened.

Although the first embodiment and the second embodiment describe a compact digital camera as an example, the present invention can also be applied in AF carried out during live view in digital video cameras, digital single-lens reflex cameras, and so on, as well as applied when using a camera function in a mobile terminal, and so on.

Third Embodiment

Figure 15:
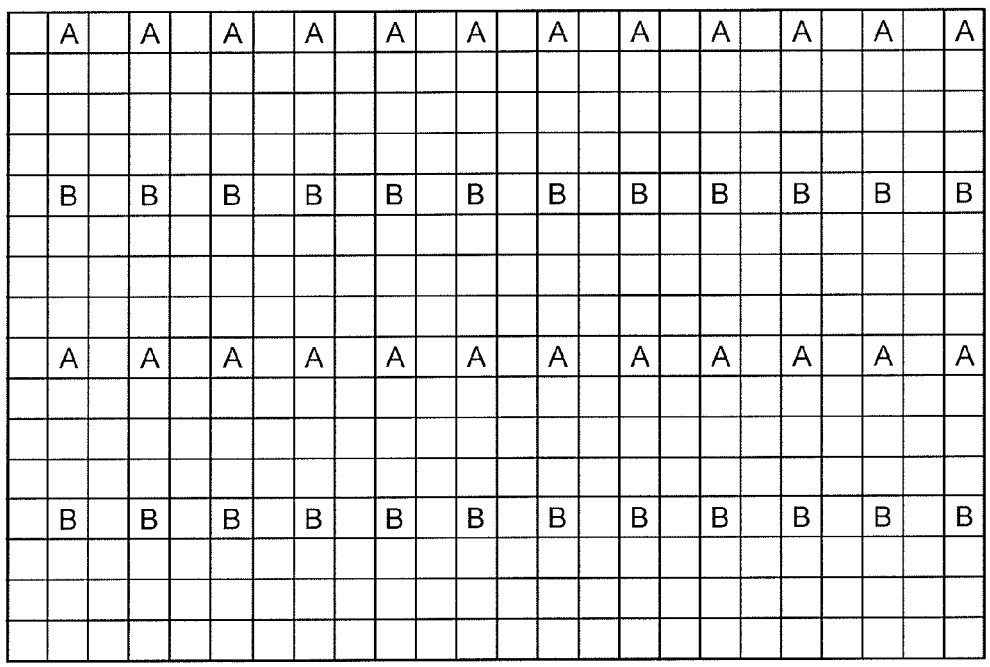
FIG. 15 is a diagram illustrating an arrangement of phase difference AF pixels in an image sensor according to a third embodiment.

Next, a third embodiment of the present invention will be described. The third embodiment is different from the first and second embodiments in that the phase difference AF pixels are disposed in the image sensor 5 as shown in FIG. 15. In the third embodiment, the phase difference AF pixels are disposed in every other column in each row, and the phase difference AF pixels are not disposed in sequential rows. The pixels indicated by "A" in FIG. 15 are pixels, of the phase difference AF pixels, that form the reference image (the A image), the pixels indicated by "B" are pixels, of the phase difference AF pixels, that form the comparison image (the B image), and the remaining pixels are image forming pixels. Note that aside from the arrangement of the pixels, the configuration of the image capturing apparatus is the same as that described in the first embodiment, and thus detailed descriptions thereof will be omitted here.

In the third embodiment, the image sensor 5 configured as described above is driven according to the timing shown in the timing chart of FIG. 8. Here, the rows that contain phase difference AF pixels are driven by the RS3, TX3, RS4, and TX4 signals in FIG. 8. This driving sets the EVF rows and the phase difference AF rows in an alternating manner.

Aside from the processing of step S503 in FIG. 10 being different, the image capture operations in the present third embodiment are the same as those described in the first embodiment, and thus that processing will be described here.

After the phase difference AF image signal recorded in step S502 has been corrected, in step S503, image signals are extracted only from the pixels indicated as "A" in FIG. 15, arranged in order of extraction, and taken as the reference image (A image). Likewise, image signals are extracted only from the pixels indicated as "B", arranged in order of extraction, and taken as the comparison image (B image). The phase difference AF processing is carried out based on the reference image (A image) and the comparison image (B image) obtained in this manner.

In the third embodiment, only the image signals read out from the EVF rows are used in the EVF display. The image signals output from the image forming pixels in the phase difference AF row are overexposed and thus the exposure amount is unsuited to EVF, but these signals are not used in the EVF display and thus there is no problem.

As described thus far, according to the third embodiment, the same effects as those described in the first embodiment can be achieved.

The arrangements of the phase difference AF pixels in the present invention are not limited to those described in the first to third embodiments, and any arrangement may be employed as long as there are rows that contain phase difference AF pixels and rows that do not contain phase difference AF pixels. In this case, at least one row that contains phase difference AF pixels is driven at the phase difference AF timing indicated by the RS3, TX3, RS4, and TX4 signals in FIG. 8, and the remaining rows that do not contain phase difference AF pixels are driven at the EVF timing indicated by the RS1, TX1, RS2, and TX2 signals in FIG. 8. Then, of the image signals output from the rows containing phase difference AF pixels driven according to the phase difference AF timing, the image signals output from the phase difference AF pixels are extracted and phase difference AF is carried out. The image signals output from rows not containing phase difference AF pixels driven at the EVF timing are used in the EVF display.

Furthermore, although the aforementioned first to third embodiments describe the focus adjustment as being carried out by driving the focus lens group 3, carrying out the focus adjustment by moving the image sensor 5 in an optical axis direction is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-202233, filed on Sep. 27, 2013 which is hereby incorporated by reference herein in its entirety.

What is claimed is:

1. An image capturing apparatus comprising:
 an image sensor having focus detection pixels that photoelectrically convert each of a pair of light fluxes that pass through different exit pupil areas of an imaging optical system and output a focus detection signal, and image forming pixels;
 a calculation unit configured to calculate a first charge accumulation period for the image forming pixels, a second charge accumulation period for the focus detection pixels, and a third charge accumulation period for a predetermined number of rows that do not contain the focus detection pixels;
 a control unit configured to read out the focus detection signal accumulated in the focus detection pixels and an image forming signal accumulated in the image forming pixels;
 a first focus control unit configured to perform phase difference focus control process based on the focus detection signal read out after accumulated for the second charge accumulation period from the focus detection pixels; and
 a second focus control unit configured to carry out a focus detection process based on a high-frequency component of an image signal obtained from the image forming pixels in a row driven with the third charge accumulation period, while moving the focus control mechanism,
 wherein the control unit reads out the focus detection signal and the image forming signal, and sets a readout rate of the focus detection signal to be lower than a readout rate of the image forming signal, and
 wherein the control unit drives the predetermined number of rows with the third charge accumulation period while moving a focus control mechanism.

2. The image capturing apparatus according to claim 1, wherein the calculation unit determines whether or not there will be a saturated focus detection pixel in the case where the focus detection pixels are driven with the second charge accumulation period, and in the case where it is determined that a saturated pixel will be present, restricts the second charge accumulation period to a period in which the focus detection pixels will not saturate.

3. The image capturing apparatus according to claim 1, wherein the calculation unit determines whether or not the second charge accumulation period is longer than a cycle in which the image signal is updated and displayed by the display unit, and in the case where the second charge accumulation period is longer, restricts the second charge accumulation period to the cycle.

4. The image capturing apparatus according to claim 3, further comprising an amplifier configured to amplify the image signal obtained from the focus detection pixels at an amplification rate corresponding to the time shortened by the restriction,
   wherein the calculation unit extends the second charge accumulation period in the case where there is an upper limit on the amplification rate of the amplifier and the exposure amount of the focus detection pixels is insufficient even when the amplification rate reaches the upper limit.

5. The image capturing apparatus according to claim 1, wherein the calculation unit determines whether or not the second charge accumulation period is longer than an upper limit time determined in advance based on a focal length of the imaging optical system, and in the case where the second charge accumulation period is longer, restricts the second charge accumulation period to the upper limit time.

6. The image capturing apparatus according to claim 5, further comprising an amplifier configured to amplify the image signal obtained from the focus detection pixels at an amplification rate corresponding to the time shortened by the restriction,
   wherein the calculation unit extends the second charge accumulation period in the case where there is an upper limit on the amplification rate of the amplifier and the exposure amount of the focus detection pixels is insufficient even when the amplification rate reaches the upper limit.

7. The image capturing apparatus according to claim 1, further comprising a photometry unit,
   wherein the calculation unit:
   finds, based on a photometry result from the photometry unit, the first charge accumulation period in which a signal having a luminance within a predetermined range is obtained from the image forming pixels; and
   finds, from the first charge accumulation period, the second charge accumulation period for the focus detection pixels based on at least one of an aperture ratio of a light-receiving area in which the focus detection pixels receive at least one of the pair of light fluxes and a light-attenuation amount due to an image height of the focus detection pixels.

8. The image capturing apparatus according to claim 7, wherein the calculation unit determines the light-attenuation amount based on a pupil distance and aperture value of the imaging optical system.

9. The image capturing apparatus according to claim 7, further comprising:
   a unit configured to set a focus detection area; and
   a unit configured to judge whether or not a point light source object is present in the set focus detection area,
   wherein in the case where it has been determined that a point light source object is present in the set focus detection area, the calculation unit adjusts the found second charge accumulation period to a time at which the focus detection pixels do not saturate.

10. The image capturing apparatus according to claim 1, wherein the third charge accumulation period that is shorter than the first charge accumulation period.

11. The image capturing apparatus according to claim 1, wherein in the case where the focus could not be adjusted by the focus control unit, the control unit drives a predetermined number of rows that do not contain the focus detection pixels with the third charge accumulation period instead of the first charge accumulation period, while moving the focus control mechanism in an optical axis direction.

12. The image capturing apparatus according to claim 1, wherein the row of the image forming pixels that does not contain the focus detection pixels includes a row driven with the first charge accumulation period and a row driven with the third charge accumulation period.

13. The image capturing apparatus according to claim 1, wherein the focus control unit does not carry out the phase difference focus control process in the case where driving is being carried out with the third charge accumulation period while moving the focus control mechanism.

14. The image capturing apparatus according to claim 1, further comprising a unit configured to set a focus detection area,
   wherein, of the rows driven with the second charge accumulation period, the control unit reads out the image signal from the focus detection pixels contained in the focus detection area that has been set.

15. The image capturing apparatus according to claim 1, further comprising a display unit configured to display the image forming signal read out after accumulated for the first charge accumulation period from the image forming pixels.

16. The image capturing apparatus according to claim 1, wherein when the second charge accumulation period is set to be longer than the first charge accumulation period, the control unit reads out the focus detection signal and the image forming signal in parallel.

17. A control method for an image capturing apparatus including an image sensor having focus detection pixels that photoelectrically convert each of a pair of light fluxes that pass through different exit pupil areas of an imaging optical system and output a focus detection signal, and image forming pixels, the method comprising:
   calculating a first charge accumulation period for the image forming pixels, a second charge accumulation period for the focus detection pixels, and a third charge accumulation period for a predetermined number of rows that do not contain the focus detection pixels;
   reading out the focus detection signal accumulated in the focus detection pixels and an image forming signal accumulated in the image forming pixels;
   performing phase difference focus control process based on the focus detection signal read out after accumulated for the second charge accumulation period from the focus detection pixels; and
   carrying out a focus detection process based on a high-frequency component of an image signal obtained from the image forming pixels in a row driven with the third charge accumulation period, while moving the focus control mechanism,
   wherein when the focus detection signal and the image forming signal are read out, a readout rate of the focus detection signal is set to be lower than a readout rate of the image forming signal, and
   wherein the predetermined number of rows are driven with the third charge accumulation period while moving a focus control mechanism.

* * * * *